(12) United States Patent
Sukhov et al.

(10) Patent No.: US 11,593,329 B2
(45) Date of Patent: Feb. 28, 2023

(54) METHODS AND DEVICES FOR FIXED EXTRAPOLATION ERROR DATA SIMPLIFICATION PROCESSES FOR TELEMATICS

(71) Applicant: Geotab Inc., Oakville (CA)

(72) Inventors: Alexey Sukhov, Georgetown (CA); Cristian Frincu, Vancouver (CA); Darren Marc Lohmann Beams, Oakville (CA)

(73) Assignee: Geotab Inc., Oakville (CA)

( * ) Notice: Subject to any disclaimer, the term of this patent is extended or adjusted under 35 U.S.C. 154(b) by 0 days.

(21) Appl. No.: 17/084,062

(22) Filed: Oct. 29, 2020

(65) Prior Publication Data

US 2022/0035779 A1 Feb. 3, 2022

Related U.S. Application Data

(60) Provisional application No. 63/075,699, filed on Sep. 8, 2020, provisional application No. 63/059,507, filed on Jul. 31, 2020.

(51) Int. Cl.
*G06F 16/215* (2019.01)
*G06F 16/23* (2019.01)
*H04L 67/12* (2022.01)
*H04Q 9/00* (2006.01)

(52) U.S. Cl.
CPC ........ *G06F 16/215* (2019.01); *G06F 16/2365* (2019.01); *H04L 67/12* (2013.01); *H04Q 9/00* (2013.01)

(58) Field of Classification Search
CPC .... G06F 16/215; G06F 16/2365; G06F 16/27; H04L 67/12; H04Q 9/00
USPC ........................................................ 707/691
See application file for complete search history.

(56) References Cited

U.S. PATENT DOCUMENTS

| 4,936,678 A | 6/1990 | Gordon |
| 5,173,691 A | 12/1992 | Sumner |
| 5,225,842 A | 7/1993 | Brown et al. |
| 5,311,197 A | 5/1994 | Sorden et al. |

(Continued)

FOREIGN PATENT DOCUMENTS

WO    WO 2016/118672 A2    7/2016

OTHER PUBLICATIONS

U.S. Appl. No. 16/928,064, filed Jul. 14, 2020, Bjorkengren.

(Continued)

*Primary Examiner* — Hosain T Alam
*Assistant Examiner* — Nicholas E Allen
(74) *Attorney, Agent, or Firm* — Wolf, Greenfield & Sacks, P.C.

(57) ABSTRACT

Methods and devices for simplifying data collected from assets are provided. An example method involves obtaining raw data from a data source at an asset, determining that a data logging trigger is satisfied by determining that a recently obtained point in the raw data differs from a corresponding predicted point predicted by extrapolation based on previously saved points included in one or more previously generated simplified sets of data by an amount of extrapolation error that is limited by an upper bound that is fixed as the raw data is collected over time, and, when the data logging trigger is satisfied, performing a dataset simplification algorithm on the raw data to generate a simplified set of data.

13 Claims, 22 Drawing Sheets

(56) References Cited

U.S. PATENT DOCUMENTS

| | | | |
|---|---|---|---|
| 5,758,313 A | 5/1998 | Shah et al. | |
| 5,815,093 A | 9/1998 | Kikinis | |
| 5,844,473 A | 12/1998 | Kaman | |
| 5,884,216 A | 3/1999 | Shah et al. | |
| 5,919,239 A | 7/1999 | Fraker | |
| 5,922,040 A | 7/1999 | Prabhakaran | |
| 6,002,982 A | 12/1999 | Fry | |
| 6,088,648 A | 7/2000 | Shah et al. | |
| 6,131,066 A | 10/2000 | Ahrens | |
| 6,211,820 B1 | 4/2001 | Zou | |
| 6,240,294 B1 | 5/2001 | Hamilton et al. | |
| 6,282,362 B1 | 8/2001 | Murphy | |
| 6,285,953 B1 | 9/2001 | Harrison | |
| 6,363,320 B1 | 3/2002 | Chou | |
| 6,366,851 B1 | 4/2002 | Chojnacki et al. | |
| 6,388,581 B1 | 5/2002 | Barker | |
| 6,389,340 B1 | 5/2002 | Rayner | |
| 6,434,631 B1 | 8/2002 | Bruno | |
| 6,473,030 B1 | 10/2002 | McBurney et al. | |
| 6,493,631 B1 | 12/2002 | Burns | |
| 6,526,341 B1 | 2/2003 | Bird et al. | |
| 6,542,077 B2 | 4/2003 | Joao | |
| 6,556,905 B1 | 4/2003 | Mittelsteadt et al. | |
| 6,636,790 B1 | 10/2003 | Lightner et al. | |
| 6,646,594 B1 | 11/2003 | Barber et al. | |
| 6,718,239 B2 | 4/2004 | Rayner | |
| 6,845,318 B1 | 1/2005 | Moore et al. | |
| 6,865,457 B1 | 3/2005 | Mittelsteadt et al. | |
| 6,922,133 B2 | 7/2005 | Wolfe | |
| 7,085,576 B2 | 8/2006 | Ranganathan | |
| 7,123,188 B2 | 10/2006 | Needham | |
| 7,155,376 B2 | 12/2006 | Yang | |
| 7,468,661 B2 | 12/2008 | Petite et al. | |
| 7,538,690 B1 | 5/2009 | Kaplan et al. | |
| 7,693,662 B2 | 4/2010 | Yamada | |
| 8,032,276 B2 | 10/2011 | Cawse | |
| 8,670,928 B2 | 3/2014 | Cawse | |
| 8,706,348 B2 | 4/2014 | Beams et al. | |
| 9,536,561 B1 | 1/2017 | Hasegawa et al. | |
| 9,600,540 B1 | 3/2017 | Bruno | |
| 10,706,605 B1 | 7/2020 | Russo et al. | |
| 10,878,328 B2 | 12/2020 | Mathur et al. | |
| 2001/0047244 A1 | 11/2001 | Harrison et al. | |
| 2002/0035422 A1 | 3/2002 | Sasaki | |
| 2002/0049529 A1 | 4/2002 | Ikeda | |
| 2002/0190851 A1 | 12/2002 | Skibinski | |
| 2003/0040272 A1 | 2/2003 | Lelievre | |
| 2003/0149530 A1 | 8/2003 | Stopczynski | |
| 2003/0169161 A1 | 9/2003 | Brown | |
| 2003/0169185 A1 | 9/2003 | Taylor | |
| 2004/0119612 A1 | 6/2004 | Chen | |
| 2004/0181495 A1 | 9/2004 | Grush | |
| 2004/0192342 A1 | 9/2004 | Ranganathan | |
| 2004/0239488 A1 | 12/2004 | Douglass et al. | |
| 2005/0065711 A1 | 3/2005 | Dahlgren et al. | |
| 2005/0171663 A1 | 8/2005 | Mittelsteadt et al. | |
| 2006/0119507 A1 | 6/2006 | Cawse | |
| 2006/0176193 A1 | 8/2006 | Wraight | |
| 2006/0184013 A1 | 8/2006 | Emanuel | |
| 2007/0073450 A1 | 3/2007 | Ampunan et al. | |
| 2007/0255531 A1 | 11/2007 | Drew | |
| 2008/0002797 A1 | 1/2008 | Raman et al. | |
| 2008/0221776 A1 | 9/2008 | McClellan | |
| 2008/0252487 A1 | 10/2008 | McClellan et al. | |
| 2008/0255722 A1 | 10/2008 | McClellan et al. | |
| 2008/0258890 A1 | 10/2008 | Follmer et al. | |
| 2008/0262670 A1 | 10/2008 | McClellan et al. | |
| 2008/0294690 A1 | 11/2008 | McClellan et al. | |
| 2009/0051510 A1 | 2/2009 | Follmer et al. | |
| 2010/0135389 A1 | 6/2010 | Tanizawa et al. | |
| 2011/0130916 A1 | 6/2011 | Mayer | |
| 2011/0202305 A1 | 8/2011 | Willis et al. | |
| 2011/0239789 A1 | 10/2011 | Takahashi et al. | |
| 2011/0286302 A1* | 11/2011 | Welker | G01V 1/3826 367/16 |
| 2012/0010810 A1 | 1/2012 | Cawse | |
| 2012/0052870 A1 | 3/2012 | Habicher | |
| 2012/0123632 A1 | 5/2012 | Nejah | |
| 2012/0226391 A1 | 9/2012 | Fryer et al. | |
| 2012/0303203 A1 | 11/2012 | Olsen et al. | |
| 2013/0013347 A1* | 1/2013 | Ling | G06Q 10/0833 705/4 |
| 2013/0030642 A1 | 1/2013 | Bradley et al. | |
| 2013/0080022 A1* | 3/2013 | McDonald | F01M 11/12 701/102 |
| 2013/0158368 A1 | 6/2013 | Pacione et al. | |
| 2013/0169644 A1* | 7/2013 | Bolton | G06T 11/206 345/440 |
| 2013/0211578 A1 | 8/2013 | Tanuma et al. | |
| 2013/0278594 A1 | 10/2013 | Kaatz et al. | |
| 2014/0040324 A1* | 2/2014 | Marcolino | G06F 16/22 707/812 |
| 2014/0375052 A1 | 12/2014 | Nielsen | |
| 2015/0224845 A1* | 8/2015 | Anderson | B60G 17/052 701/37 |
| 2016/0186562 A1* | 6/2016 | Lee | G06Q 50/02 702/6 |
| 2016/0212589 A1* | 7/2016 | Cawse | G08G 1/052 |
| 2016/0321154 A1 | 11/2016 | Prytz | |
| 2017/0004137 A1 | 1/2017 | Raina et al. | |
| 2017/0023379 A1 | 1/2017 | El-Ghazal et al. | |
| 2017/0067404 A1 | 3/2017 | Yonan et al. | |
| 2017/0149601 A1* | 5/2017 | Cawse | H04W 52/0209 |
| 2017/0161965 A1* | 6/2017 | Du | G06F 11/36 |
| 2017/0219360 A1 | 8/2017 | Cui et al. | |
| 2017/0249402 A1 | 8/2017 | Liu et al. | |
| 2017/0250855 A1* | 8/2017 | Patil | H04L 41/064 |
| 2017/0309045 A1 | 10/2017 | Asente et al. | |
| 2017/0309092 A1* | 10/2017 | Rosenbaum | G01M 17/007 |
| 2017/0364821 A1* | 12/2017 | Mathur | G06N 20/00 |
| 2018/0041965 A1 | 2/2018 | Korneluk et al. | |
| 2018/0112990 A1 | 4/2018 | Fowe et al. | |
| 2018/0179888 A1* | 6/2018 | Switzer | E21B 47/13 |
| 2018/0284736 A1 | 10/2018 | Cella et al. | |
| 2019/0087247 A1 | 3/2019 | Chakraborty et al. | |
| 2019/0102840 A1 | 4/2019 | Perl et al. | |
| 2019/0196501 A1* | 6/2019 | Lesher | B60T 7/22 |
| 2020/0033142 A1 | 1/2020 | Flug et al. | |
| 2020/0118355 A1 | 4/2020 | Soda et al. | |
| 2020/0145304 A1* | 5/2020 | Wulff | H04L 67/322 |
| 2021/0271474 A1 | 9/2021 | Batra et al. | |
| 2021/0390110 A1 | 12/2021 | Bjorkengren | |
| 2022/0035778 A1 | 2/2022 | Sukhov et al. | |
| 2022/0035780 A1 | 2/2022 | Sukhov et al. | |
| 2022/0090933 A1 | 3/2022 | Corbiere et al. | |
| 2022/0166813 A1 | 5/2022 | Sukhov et al. | |
| 2022/0166834 A1 | 5/2022 | Sukhov et al. | |
| 2022/0171753 A1 | 6/2022 | Baker, Jr. et al. | |

OTHER PUBLICATIONS

U.S. Appl. No. 16/928,071, filed Jul. 14, 2020, Bjorkengren.
U.S. Appl. No. 17/083,972, filed Oct. 29, 2020, Sukhov et al.
U.S. Appl. No. 17/084,008, filed Oct. 29, 2020, Sukhov et al.
U.S. Appl. No. 17/084,086, filed Oct. 29, 2020, Sukhov et al.
[No Author Listed] Global Positioning System. Wikipedia. https://en.wikipedia.org/w/index.php?title=Global_Positioning_System&oldid=959561822. Last accessed May 29, 2020, 21 pages.
[No Author Listed] On-Board Diagnostics. Wikipedia. https://en.wikipedia.org/w/index.php?title=On-board_diagnostics&oldid=959687904#Vehicle_telemancs, Last accessed May 30, 2020, 15 pages.
[No Author Listed] Ramer-Douglas_Peucker Algorithm. Wikipedia. https://en.wikipedia.org/w/index.php?title=Ramer-Douglas-Puecker_algorithm&oldid=942730100. Last accessed Feb. 26, 2020.
Extended European Search Report for European Application No. 21179930.9, dated Dec. 2, 2021.
Extended European Search Report for European Application No. 21181966.9, dated Dec. 17, 2021.
Extended European Search Report for European Application No. 21183027.8, dated Dec. 17, 2021.

(56) References Cited

OTHER PUBLICATIONS

Extended European Search Report for European Application No. 21184416.2, dated Dec. 17, 2021.
Bhattacharya et al., Robust and energy-efficient trajectory tracking for mobile devices. IEEE Transactions on Mobile Computing. Apr. 25, 2014;14(2):430-43.
Douglas et al., Algorithms for the reduction of the number of points required to represent a digitized line or its caricature. Cartographica: the international journal for geographic information and geovisualization. Oct. 1, 1973;10(2):112-22.
Gudmundsson et al., Compressing spatio-temporal trajectories. Computational Geometry. Nov. 1, 2009;42(9):825-41.
Holzinger et al., Hierarchical coupling approach utilizing multi-objective optimization for non-iterative co-simulation. Proceedings of the 13th International Modelica Conference, Regensburg, Germany, Mar. 4-6, 2019:735-40.
Kjærgaard et al., Energy-efficient trajectory tracking for mobile devices. MobiSys '11: Proceedings of the 9th International Conference on Mobile Systems, Applications, and Services. Jun. 28, 2011:307-320.
Lange et al., Efficient real-time trajectory tracking. The VLDB Journal. Oct. 2011;20(5):671-94.
Lopes et al., Traffic and mobility data collection for real-time applications. 13th International IEEE Conference on Intelligent Transportation Systems. Sep. 19, 2010:216-23.
Teng et al., Location-awareness in time series compression. European Conference on Advances in Databases and Information Systems. Sep. 2, 2018:82-95.
Wu et al., CLSTERS: A general system for reducing errors of trajectories under challenging localization situations. Proceedings of the ACM on Interactive, Mobile, Wearable and Ubiquitous Technologies. Sep. 11, 2017;1(3):1-28.
U.S. Appl. No. 17/084,086, filed Mar. 8, 2021, Sukhov et al.
U.S. Appl. No. 17/194,792, filed Mar. 8, 2021, Sukhov et al.
EP21179930.9, Dec. 2, 2021, Extended European Search Report.
EP21181966.9, Dec. 17, 2021, Extended European Search Report.
EP21183027.8, Dec. 17. 2021, Extended European Search Report.
EP21184416.2, Dec. 17, 2021, Extended European Search Report.
U.S. Appl. No. 17/211,671, filed Mar. 24, 2021, Bjorkengren.
Kononen et al., Identification and validation of a logistic regression model for predicting serious injuries associated with motor vehicle crashes. Accident Analysis & Prevention. Jan. 1, 2011;43(1):112-22.
Van Hunnik, Extensive comparison of trajectory simplification algorithms. Utrecht University MS Thesis. Feb. 9, 2017:1-22.
De Koning, psimpl generic n-dimensional poyline simplification: Douglas-Peucker. http://psimpl.sourceforge.net/douglas-peucker.html. 2010:1-4.

\* cited by examiner

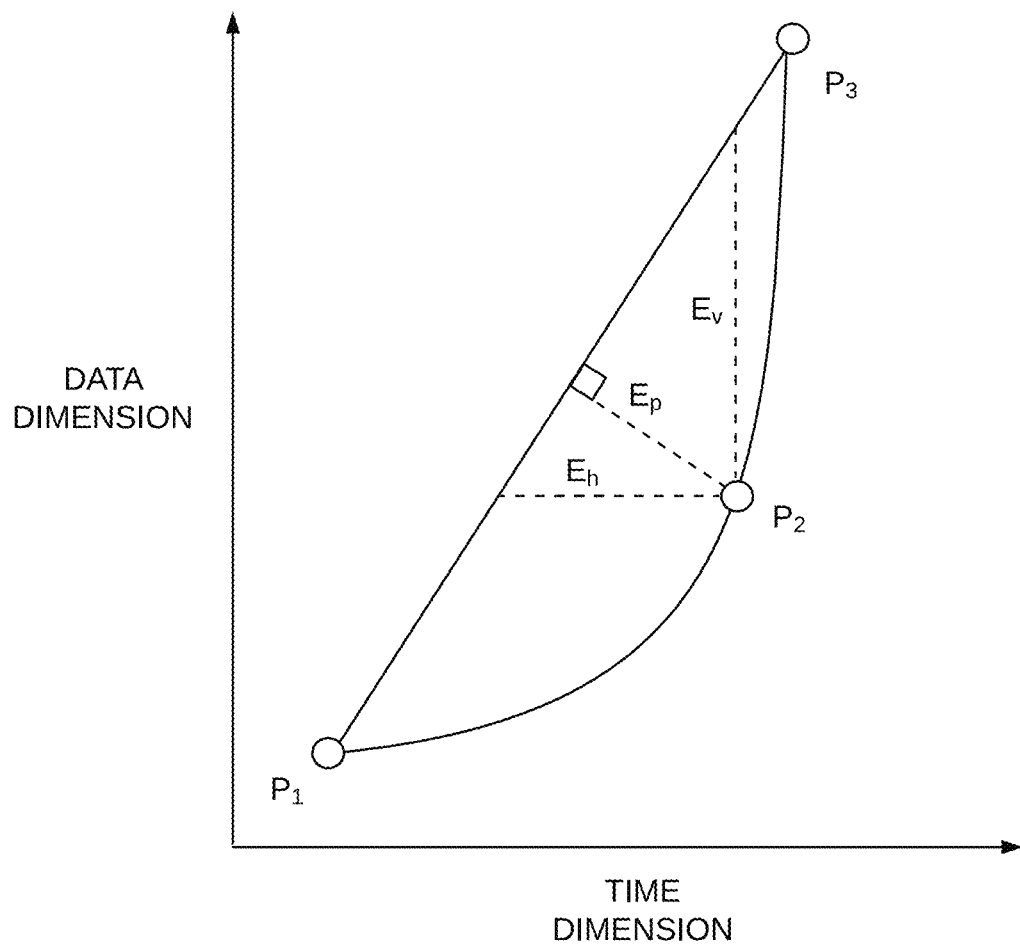
FIG. 2A
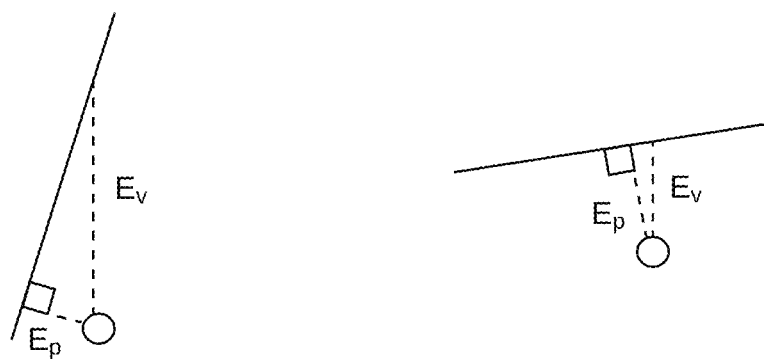
FIG. 2B  FIG. 2C

METHODS AND DEVICES FOR FIXED EXTRAPOLATION ERROR DATA SIMPLIFICATION PROCESSES FOR TELEMATICS

RELATED APPLICATIONS

This application claims the benefit under 35 U.S.C. § 119(e) to U.S. Provisional Application Ser. No. 63/075,699, filed on Sep. 8, 2020, and U.S. Provisional Application Ser. No. 63/059,507, filed on Jul. 31, 2020, each of which is herein incorporated by reference in its entirety.

FIELD

The present disclosure relates to telematics, and in particular, to the simplification of data collected from assets tracked by telematics systems.

BACKGROUND

A telematics system may track the location and other data related to an asset, such as a vehicle, directly through the asset or through an asset tracking device coupled to the asset. The location of the asset may be tracked through the use of a satellite navigation system, such as a Global Positioning System (GPS), Global Navigation Satellite System (GNSS), cellular tower network, or other system. Other data may be collected through sensors onboard the asset. In the case where the asset tracking device is coupled to a vehicle, the asset tracking device may collect information through a communication port of the vehicle (e.g., a diagnostic port), through which a variety of vehicle data, such as engine speed, battery temperature, fuel level, tire pressure, outside temperature, or other data may be obtained. In the case where the asset is monitored by an integrated tracking system, such data may be received from electronic control units (ECUs) onboard the asset either directly or through a controlled area network (CAN). In either case, such data may be received and recorded at a telematics system and used in the provision of a telematics service, such as a fleet management tool, or for data analysis.

SUMMARY

According to an aspect of the disclosure, a method for capturing a simplified set of data from an asset through a fixed estimation error data simplification process is provided. The method involves obtaining raw data from a data source at an asset, determining whether a data logging trigger is satisfied, and, when the data logging trigger is satisfied, performing a dataset simplification algorithm on the raw data to generate a simplified set of data in which interpolation error is limited by an upper bound that is fixed across the simplified set of data.

According to another aspect of the disclosure, a device for capturing a simplified set of data from an asset in accordance with a fixed estimation error data simplification process is provided. The device includes an interface layer to receive raw data from one or more data sources at an asset; a memory to store the raw data; a controller to: determine whether a data logging trigger is satisfied, and when the data logging trigger is satisfied, perform a dataset simplification algorithm on the raw data to generate a simplified set of data in which interpolation error is limited by an upper bound that is fixed across the simplified set of data; and a communication interface to transmit the simplified set of data to a server.

The raw data may include a target set of data that is recorded over time, and generating the simplified set of data may involve including a point from the target set of data in the simplified set of data if the point is distant, along a data dimension of the target set of data, from a reference line running through the target set of data, in excess of a threshold simplification value. The raw data may include a target set of data that is recorded over time, and generating the simplified set of data may involve: (i) defining a first reference line through the target set of data from a first point in the target set of data to a last point in the target set of data with respect to time; (ii) determining which point in the target set of data is most distant, along a data dimension of the target set of data, from the first reference line; (iii) if the most distant point is distant from the first reference line, along the data dimension, in excess of a threshold simplification value, including that most distant point in the simplified set of data; and (iv) iteratively subdividing the target set of data into smaller segments and repeating steps (i) through (iii) on each segment, each of which is bounded by the first point in the target set of data, a point that was previously included in the simplified set of data, or the last point in the target set of data, as the case may be, using, for each segment, a new reference line defined between the first point bounding that segment and the last point bounding that segment as the respective reference line for that segment, until there are no further points in any segment that are distant from its respective reference line, along the data dimension, in excess of the threshold simplification value. The raw data may include a target set of data that includes a plurality of data streams recorded over time, and generating the simplified set of data may involve including a point from the target set of data in the simplified set of data if the point is distant, along at least one data dimension of the target set of data, from a reference line running through the target set of data, in excess of a threshold simplification value that corresponds to that data dimension. The simplified set of data may be transmitted to a server. The raw data may include a target set of data that is recorded over time, and determining that a data logging trigger is satisfied may involve determining that a recently obtained point in the raw data differs from a corresponding predicted point predicted by extrapolation based on previously saved points included in one or more previously generated simplified sets of data by an amount of extrapolation error that is limited by an upper bound that is fixed as the raw data is collected over time. The asset may be a vehicle, and the raw data may describe a property, state, or operating condition of the vehicle. The raw data may be obtained by a controller onboard the asset, and the data source may comprises one or more of: an electronic control unit (ECU) of the asset from which the controller is configured to obtain the raw data through an interface layer directly or via a controlled area network (CAN), and a sensor onboard the asset. The raw data may be obtained by a controller of an asset tracking device coupled to the asset, and the data source may comprise one or more of: a communication port of the asset through which the asset tracking device is configured to receive the raw data from one or more electronic control units (ECUs) of the asset via a controlled area network (CAN), and a sensor of the asset tracking device. The memory of the device may include a raw data buffer in which the raw data is temporarily stored prior to dataset simplification.

According to another aspect of the disclosure, a method for capturing a simplified set of data from an asset in accordance with a fixed estimation error data simplification process is provided. The method involves receiving a set of simplified data at a server, the simplified set of data generated by application of a dataset simplification algorithm on raw data obtained from a data source at an asset upon satisfaction of a data logging trigger, wherein the dataset simplification algorithm causes interpolation error within the simplified set of data to be limited by an upper bound that is fixed across the simplified set of data; receiving a request for a status of the asset; and interpolating a status of the asset based on the simplified set of data in response to the request.

According to another aspect of the disclosure, a system for capturing a simplified set of data from an asset in accordance with a fixed estimation error data simplification process is provided. The system includes an interface layer at an asset to receive raw data from a data source at the asset; a controller at the asset to: determine whether a data logging trigger is satisfied, and when the data logging trigger is satisfied, perform a dataset simplification algorithm on the raw data to generate a simplified set of data in which interpolation error is limited by an upper bound that is fixed across the simplified set of data; a communication interface at the asset to transmit the simplified set of data; and a server to: receive the simplified set of data, and interpolate a status of the asset based on the simplified set of data in response to a status request.

The server may be to indicate the upper bound on interpolation error. The server may be to provide an indication of the interpolated status of the asset and an indication of the upper bound on interpolation error to an end user device. The raw data may include a target set of data that is recorded over time, and generating the simplified set of data may involve including a point from the target set of data in the simplified set of data if the point is distant, along a data dimension of the target set of data, from a reference line running through the target set of data, in excess of a threshold simplification value. The raw data may include a target set of data that is recorded over time, and generating the simplified set of data involves: (i) defining a first reference line through the target set of data from a first point in the target set of data to a last point in the target set of data with respect to time; (ii) determining which point in the target set of data is most distant, along a data dimension of the target set of data, from the first reference line; (iii) if the most distant point is distant from the first reference line, along the data dimension, in excess of a threshold simplification value, including that most distant point in the simplified set of data; and (iv) iteratively subdividing the target set of data into smaller segments and repeating steps (i) through (iii) on each segment, each of which is bounded by the first point in the target set of data, a point that was previously included in the simplified set of data, or the last point in the target set of data, as the case may be, using, for each segment, a new reference line defined between the first point bounding that segment and the last point bounding that segment as the respective reference line for that segment, until there are no further points in any segment that are distant from its respective reference line, along the data dimension, in excess of the threshold simplification value. The raw data may include a target set of data that includes a plurality of data streams recorded over time; and generating the simplified set of data may involve including a point from the target set of data in the simplified set of data if the point is distant, along at least one data dimension of the target set of data, from a reference line running through the target set of data, in excess of a threshold simplification value that corresponds to that data dimension. The raw data may include a target set of data that is recorded over time, and determining that a data logging trigger is satisfied may involve determining that a recently obtained point in the raw data differs from a corresponding predicted point predicted by extrapolation based on previously saved points included in one or more previously generated simplified sets of data by an amount of extrapolation error that is limited by an upper bound that is fixed as the raw data is collected over time. The asset may be a vehicle, and the raw data may describe a property, state, or operating condition of the vehicle. The raw data may be obtained by a controller onboard the asset, and the data source may comprises one or more of: an electronic control unit (ECU) of the asset from which the controller is configured to obtain the raw data through an interface layer directly or via a controlled area network (CAN); and a sensor onboard the asset. The raw data may be obtained by a controller of an asset tracking device coupled to the asset, and the data source may comprise one or more of: a communication port of the asset through which the asset tracking device is configured to receive the raw data from one or more electronic control units (ECUs) of the asset via a controlled area network (CAN); and a sensor of the asset tracking device.

According to another aspect of the disclosure, another method for capturing a simplified set of data from an asset in accordance with a fixed estimation error data simplification process is provided. The method involves obtaining raw data from a data source at an asset; determining that a data logging trigger is satisfied by determining that a recently obtained point in the raw data differs from a corresponding predicted point predicted by extrapolation based on previously saved points included in one or more previously generated simplified sets of data by an amount of extrapolation error that is limited by an upper bound that is fixed as the raw data is collected over time; and when the data logging trigger is satisfied, performing a dataset simplification algorithm on the raw data to generate a simplified set of data.

According to another aspect of the disclosure, another device for capturing a simplified set of data from an asset in accordance with a fixed estimation error data simplification process is provided. The device includes an interface layer to receive raw data from one or more data sources at an asset; a memory to store the raw data; a controller to: determine that a data logging trigger is satisfied by determining that a recently obtained point in the raw data differs from a corresponding predicted point predicted by extrapolation based on previously saved points included in one or more previously generated simplified sets of data by an amount of extrapolation error that is limited by an upper bound that is fixed as the raw data is collected over time; and when the data logging trigger is satisfied, perform a dataset simplification algorithm on the raw data to generate a simplified set of data; and a communication interface to transmit the simplified set of data to a server.

The raw data may include a target set of data that is recorded over time, and determining that the data logging trigger is satisfied may involve determining that a recently obtained point in the target set of data is distant, along a data dimension of the target set of data, from a trend line running through the target set of data, in excess of a threshold trigger value. The raw data may include a target set of data that is recorded over time, and determining whether the data logging trigger is satisfied involves: (i) defining a trend line through one or more previously obtained points in the target set of data; (ii) determining whether the recently obtained point is distant, along a data dimension of the target set of data, from the trend line, in excess of a threshold trigger value; and (iii) if the recently obtained point is distant, along the data dimension, from the trend line, in excess of the threshold trigger value, determining that the data logging trigger is satisfied. The raw data may include a target set of data that includes a plurality of data streams recorded over time; and determining that the data logging trigger is satisfied may involve determining that a recently obtained point is distant, along at least one data dimension of the target set of data, from a trend line running through the target set of data, in excess of a threshold trigger value that corresponds to that data dimension. The simplified set of data may be transmitted to a server. The simplified set of data may be generated so that interpolation error within the simplified set of data is limited by an upper bound that is fixed across the simplified set of data. The asset may be a vehicle, and the raw data may describe a property, state, or operating condition of the vehicle. The raw data may be obtained by a controller onboard the asset, and the data source comprises one or more of: an electronic control unit (ECU) of the asset from which the controller is configured to obtain the raw data through an interface layer directly or via a controlled area network (CAN); and a sensor onboard the asset. The raw data may be obtained by a controller of an asset tracking device coupled to the asset, and the data source comprises one or more of: a communication port of the asset through which the asset tracking device is configured to receive the raw data from one or more electronic control units (ECUs) of the asset via a controlled area network (CAN); and a sensor of the asset tracking device. The memory of the device may include a raw data buffer in which the raw data is temporarily stored prior to dataset simplification.

According to another aspect of the disclosure, a method for capturing a simplified set of data from an asset in accordance with a fixed estimation error data simplification process is provided. The method involves receiving a simplified set of data at a server, the simplified set of data generated by application of a dataset simplification algorithm on raw data obtained from a data source at an asset upon satisfaction of a data logging trigger, wherein the data logging trigger was satisfied by a determination that a recently obtained point in the raw data differed from a corresponding predicted point predicted by extrapolation based on previously saved points included in one or more previously generated simplified sets of data by an amount of extrapolation error that is limited by an upper bound that is fixed as the raw data is collected over time; receiving a request for a status of the asset; and extrapolating a status of the asset based on the simplified set of data in response to the request.

According to another aspect of the disclosure, a system for capturing a simplified set of data from an asset in accordance with a fixed estimation error data simplification process is provided. The system includes an interface layer at an asset to receive raw data from a data source at the asset; a controller at the asset to: determine that a data logging trigger is satisfied by determining that a recently obtained point in the raw data differs from a corresponding predicted point predicted by extrapolation based on previously saved points included in one or more previously generated simplified sets of data by an amount of extrapolation error that is limited by an upper bound that is fixed as the raw data is collected over time; and when the data logging trigger is satisfied, perform a data simplification algorithm on the raw data to generate a simplified set of data; a communication interface at the asset to transmit the simplified set of data; and a server to: receive the simplified set of data; and extrapolate a status of the asset based on the simplified set of data in response to a status request.

The server may be to indicate the upper bound on extrapolation error. The server may be to provide an indication of the extrapolated status of the asset and an indication of the upper bound on extrapolation error to an end user device. The raw data may include a target set of data that is recorded over time, and determining that the data logging trigger is satisfied may involve determining that a recently obtained point in the target set of data is distant, along a data dimension of the target set of data, from a trend line running through the target set of data, in excess of a threshold trigger value. The raw data may include a target set of data that is recorded over time, and determining whether the data logging trigger is satisfied may involve: (i) defining a trend line through one or more previously obtained points in the target set of data; (ii) determining whether the recently obtained point is distant, along a data dimension of the target set of data, from the trend line, in excess of a threshold trigger value; and (iii) if the recently obtained point is distant, along the data dimension, from the trend line, in excess of the threshold trigger value, determining that the data logging trigger is satisfied. The raw data may include a target set of data that includes a plurality of data streams recorded over time; and determining that the data logging trigger is satisfied may involve determining that a recently obtained point is distant, along at least one data dimension of the target set of data, from a trend line running through the target set of data, in excess of a threshold trigger value that corresponds to that data dimension. The simplified set of data may be generated so that interpolation error within the simplified set of data is limited by an upper bound that is fixed across the simplified set of data. The asset may be a vehicle, and the raw data may describe a property, state, or operating condition of the vehicle. The raw data may be obtained by a controller onboard the asset, and the data source may comprise one or more of: an electronic control unit (ECU) of the asset from which the controller is configured to obtain the raw data through an interface layer directly or via a controlled area network (CAN); and a sensor onboard the asset. The raw data may be obtained by a controller of an asset tracking device coupled to the asset, and the data source may comprise one or more of: a communication port of the asset through which the asset tracking device is configured to receive the raw data from one or more electronic control units (ECUs) of the asset via a controlled area network (CAN); and a sensor of the asset tracking device.

BRIEF DESCRIPTION OF THE DRAWINGS

FIG. 2A is an example data-time plot that shows the vertical, perpendicular, and horizontal distances from a point to a reference line. FIGS. 2B and 2C are illustrations comparing vertical distance to perpendicular distance from a point to a line with a large slope and a line with small slope.

DETAILED DESCRIPTION

Figure 1:
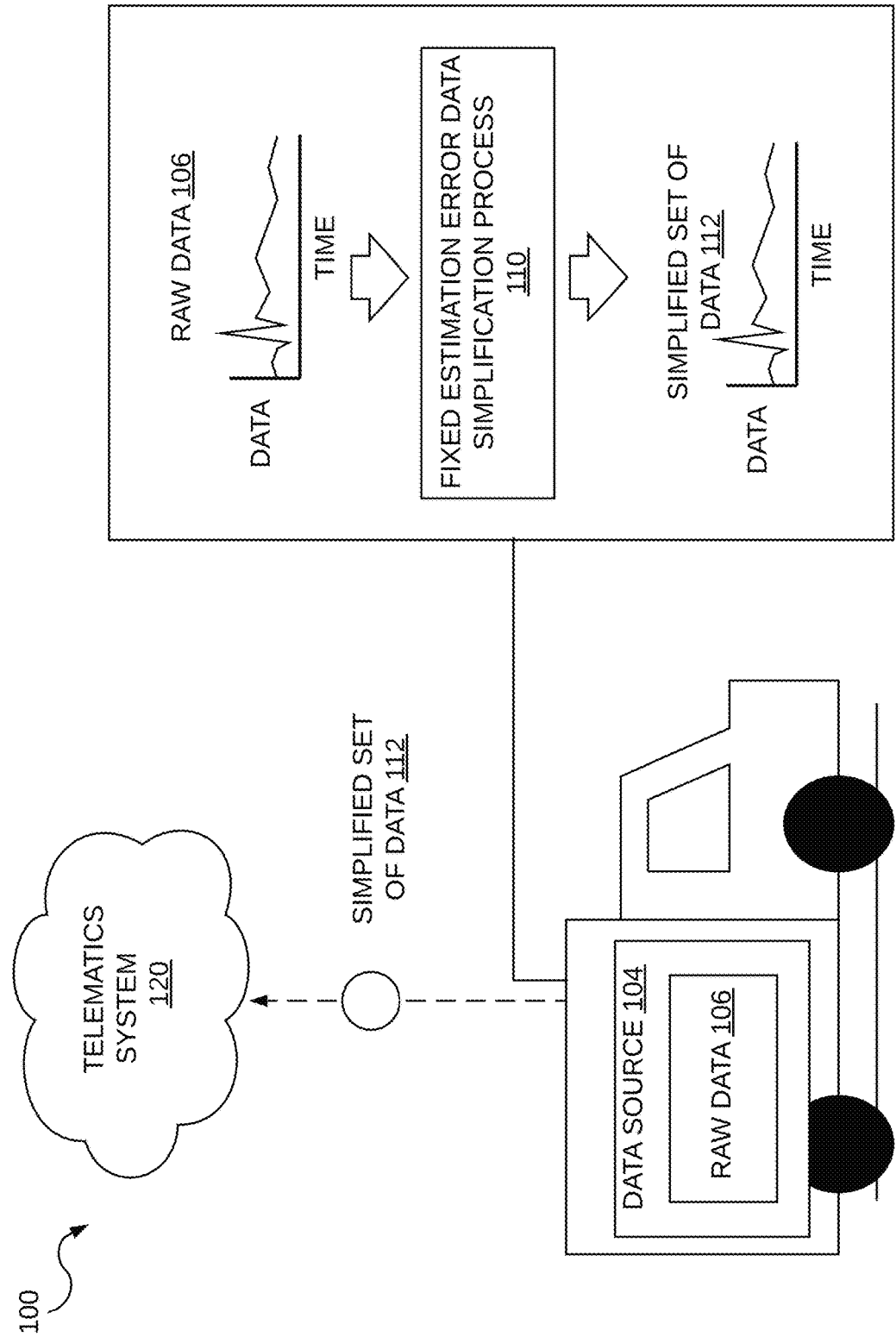
FIG. 1 is a schematic diagram of an example system for capturing a simplified set of data from an asset through a fixed estimation error data simplification process.

A telematics system that tracks a high number of assets could potentially produce a very large quantity of data. Therefore, telematics systems typically employ one or more data sampling, reduction, filtering, or simplification techniques that result in a large portion of the data that is collected at assets being discarded, leaving only a smaller portion of the most operationally-salient data to be transmitted to, and retained by, servers at the telematics system, for further use. Such data simplification techniques may be applied directly at the asset level (e.g., onboard the asset directly or through an asset tracking device) before any data is transmitted to back-end systems. In this way, a telematics system can provide an accurate picture of the state of an asset as it changes over time, while safely discarding any redundant or unnecessarily-collected data points that would otherwise unduly burden the telematics system with excessive data transmission and data storage requirements.

Although only a small fraction of data points that are made available by collection at an asset may be retained by a telematics system, the status of the asset at any point in time, including times during which no data points were recorded, may be of interest. Indeed, most queries to a telematics system for the status of an asset are likely to pertain to a time at which no data points were actually recorded. The status at such points in time may be approximated by value estimation based on the data that was recorded. Value estimation may take the form of interpolation or extrapolation, depending on the point in time in question.

In the case of interpolation, it may be reasonable to assume that the status of the asset could be estimated as being some value between the data point recorded immediately before the time in question and the data point recorded immediately after that time. Such an estimated value may be obtained via linear interpolation or another interpolation technique based on one or more additional points. This principle applies similarly in the case of extrapolation, where it may be reasonable to assume that the status of the asset after the most recently recorded data point (e.g., its current status) may be estimated as being some value that is predicted by a recent trend in the data. Such an estimated value may be obtained via linear extrapolation or another extrapolation technique based on one or more additional points. In either case, these estimates are reasonable because any drastic change in the data that would cause such estimations to be significantly inaccurate would have been captured by a sufficiently robust data simplification technique. For example, if the speed of a vehicle is recorded as being at 60 km/h at one time, and again as being at 60 km/h one minute later, and the speed of the vehicle is captured at the vehicle every ten seconds, then it can be reasonably estimated that the speed of the vehicle was 60 km/h throughout the entire minute, within a certain tolerable threshold for error, since no additional points were recorded.

Although value estimation calculations may be useful to describe the status of an asset at points in time when no data was actually collected, value estimation calculations are associated with a certain amount of error, and that amount of error may not always be readily apparent. Rather, in many cases, the error that is associated with any particular value estimation calculation may vary wildly depending on the data simplification technique that was employed to generate the simplified data set that is being used for value estimation, and/or the nature of the raw data that was collected around the time at which the status of the asset is being estimated. For example, if a simple periodic sampling of data was employed to generate a simplified set of data with which the telematics system is to perform value estimation calculations, then any amount of change in the data can take place at the asset between one periodically-recorded point and the next, with no indication to be detected by the telematics system. More advanced aperiodic data simplification techniques may be better at capturing operationally-salient changes in data, but still may fail to provide for accurate value estimation in which the amount of error associated with each value estimation calculation is known. For example, one data simplification technique involves the application of the Ramer-Douglas-Peucker algorithm, an iterative process in which a curve of data is simplified into a similar curve composed of fewer points. However, the amount of error that is associated with value estimation performed on a data that was simplified by the Ramer-Douglas-Peucker algorithm can vary widely depending on how quickly the underlying raw data that was simplified was changing over time—or in other words, how large or small the slope of the curve was at the relevant time. A comparison of the solution proposed herein to the Ramer-Douglas-Peucker approach is provided later in this disclosure.

Since it may not always be transparent how much error is involved with any given instance of value estimation performed by a telematics system, there may be a general lack of confidence in the reliability of the data presented. Such a lack of confidence may pose a problem when the estimated data is to be used for an analysis that requires a high degree of precision. For example, when analyzing whether or not a vehicle has been speeding through an area where the posted speed limit is 60 km/h, if the vehicle was recorded as travelling at 58 km/h at one point in time and again at 58 km/h at the next, one can only be confident that the vehicle did not exceed the speed limit between those two points in time if it is known that the error associated with interpolating between these two data points would be at most 2 km/h. If the amount of interpolation error being assumed was unknown (and could be greater than 2 km/h), an interpreter of the data may not be able to confidently conclude whether or not the vehicle was speeding. Indeed, as will be seen below, the amount of error that is associated with value estimation calculations performed on data sets simplified under the Ramer-Douglas-Peucker approach, for example, will be higher when the rate of change in the data is high, and lower when the rate of change of the data is low. In other words, there is an unevenly distributed amount of value estimation error, or an inconsistent error profile, throughout the data.

To address these and other problems, this disclosure provides systems, methods, and devices for capturing simplified sets of data from assets for telematics systems in such a manner that the amount of error that is associated with value estimation calculations performed on the simplified data is known and fixed throughout the data. That is, the amount of error that is associated with interpolation or extrapolation of the data is known in advance to be bounded by a predetermined upper limit. This process may be referred to as a fixed estimation error data simplification process.

The fixed estimation error data simplification process proposed herein comprises two broad facets: a fixed estimation error dataset simplification algorithm which simplifies sets of data so that interpolation calculations made on the simplified data may be made with advanced knowledge of the interpolation error being assumed, and a fixed estimation error data logging algorithm which triggers the generation of simplified sets of data based on deviations of newly collected data from recent trends in the data to degree that is known in advanced so that extrapolation calculations made on the simplified data may be made with advanced knowledge of the extrapolation error being assumed.

A fixed, constant, or consistent amount of value estimation error is achieved by considering the "vertical" deviation of each data point from the overall trend of the data while excluding the "horizontal" deviation made by the collection of such data over time. The "horizontal" deviation caused by the collection of data over time was found to have caused inconsistencies in estimation error across the data set depending on how quickly data was changing over time. The proposed data simplification process is distinct from prior processes which inherently consider, and therefore are inherently biased by, effects caused by the collection of data over time.

In addition to providing a fixed error profile for value estimation throughout the reduced set of data, the emphasis on the "vertical" deviation that each data point has from the overall trend in the data may in some cases also result in a greater density of data points being retained around more rapidly changing segments of data. Fortuitously, this may result in the more interesting and operationally-salient data being collected with higher resolution. Thus, the techniques provided herein not only improve the reliability of value estimation calculations performed on simplified sets of data, but may also improve the richness of data collected in the areas that are likely to be of greatest interest.

FIG. 1 is a schematic diagram of an example system 100 for capturing a simplified set of data from an asset through a fixed estimation error data simplification process.

The system 100 includes an asset 102. For exemplary purposes, the asset 102 is shown as a vehicle, namely a commercial transport truck. However, the asset 102 may include any type of vehicular asset, such as a passenger vehicle, construction equipment, sporting vehicle, utility vehicle, naval vessel, aircraft, or any other vehicular asset. The asset 102 may also include any non-vehicular asset, such as a transport trailer, shipping container, pallet, shipped item, or any other non-vehicular asset that can be tracked.

In some examples, the asset 102 may be coupled to an asset tracking device (not shown) that tracks data pertaining to the asset. In other examples, the asset 102 may include an onboard tracking system that tracks data pertaining to the asset 102 directly. In either case, a processor/controller on the asset 102 and/or asset tracking device obtains data, such as the location of the asset 102, and other types of data from sensors (e.g, accelerometer data) or electronic control units (ECUs) of the asset 102 (e.g., vehicle speed data). In the case of location data, the location of the asset 102 may be obtained from a locating system such as a Global Positioning System (GPS), a Global Navigation Satellite System (GNSS), a cellular tower network, Wi-Fi networks, or another location system. In the case of sensor data, that data may be obtained from a sensor onboard the asset 102 or a sensor on an asset tracking device coupled to the asset 102, if applicable. In the case of data from an ECU, that data may be obtained from the ECU directly (e.g., through a Controlled Area Network (CAN) bus) or, if an asset tracking device is being used, through a communication port such as an onboard diagnostic port (e.g., OBD2 port) of the asset 102. Any of the above sources of data may be referred to as a data source 104. The data collected from a data source 104 is indicated generally as raw data 106.

The system 100 further includes a telematics system 120 to record data captured from the asset 102 and other assets, including location data, trip/travel histories, accelerometer data, vehicle speed data, engine data, and other data pertaining to the assets it tracks. The telematics system 120 may further store user accounts and other data associated with the assets and/or asset tracking devices for the provision of telematics services. The telematics system 120 includes one or more servers or computing devices to store such data and to provide a telematics service and/or data analysis based on the recorded data. In particular, the telematics system 120 includes at least one server with a communication interface to communicate with the asset 102 (or an asset tracking device coupled to the asset 102, if applicable) via one or more computing networks and/or telecommunication networks, a memory to store data and programming instructions, and a controller to execute the methods performed by the telematics system 120 as described herein. The telematics system 120 may provide a telematics service, including live tracking, record keeping, and reporting services to end user (client) devices, and may further store or forward the data collected from the asset 102 and other assets to other systems for further analytics purposes.

Only a small portion of the raw data 106 that is collected at the asset 102 is transmitted to the telematics system 120. The remainder of the raw data 106 is discarded as being redundant or not operationally-salient for the purposes of the telematics system 120. For raw data 106 that is time-variant (e.g., accelerometer data, engine speed data), that data may be passed through a fixed estimation error data simplification process 110, which is described in detail throughout this disclosure. One example set of data that has been passed through the process 110 is shown for example as a simplified set of data 112. A simplified set of data 112 is transmitted to the telematics system 120 each time a data logging trigger is satisfied. Data logging triggers are discussed in greater detail later in this disclosure. Some of the other portions of the raw data 106 may be transmitted to the telematics system 120 directly (i.e., as raw data), or after being passed through an alternative data simplification process.

The fixed estimation error data simplification process 110 generates the simplified set of data 112 in such a way that the simplified set of data 112 has at least one of the two following properties.

First, interpolation error is limited by an upper bound that is fixed across the simplified set of data 112. In other words, when an interpolation calculation is made within the simplified set of data 112 between two actually recorded data points, the amount of error that is associated with that interpolation calculation is known in advance to be a fixed value that is consistent throughout the data. The amount of error is configurable, and can differ depending on the type of data being collected, but it does not vary depending on the nature of the data as it is being collected (e.g., how the data is changing over time). Thus, when interpolation calculations are requested of the telematics system 120 (e.g., when an end user device makes a status request of the asset 102 at a particular point in time), the status of the asset 102 may be provided with a known degree of precision, along with the amount of interpolation error being assumed. A fixed amount of interpolation error is achieved by considering the "vertical" deviation of each data point from the overall trend of the data while excluding the "horizontal" deviation made by the collection of such data over time, as discussed in greater detail further below.

Second, extrapolation error is similarly limited by an upper bound that is fixed as the raw data 106 is collected over time. In other words, generation of the simplified set of data 112 was triggered by the satisfaction of a data logging trigger in which it was determined that a recently obtained data point in the raw data 106 differed from a corresponding predicted data point, predicted by extrapolation based on previously recorded data points, by an amount of extrapolation error that is limited by an upper bound that remains fixed as the raw data 106 is collected over time. As in the case of interpolation error, the amount of tolerable extrapolation error is configurable, and can differ depending on the type of data being collected, but it does not vary depending on the nature of the data as it is being collected (e.g., how the data is changing over time). Thus, when the current status of the asset 102 is requested at the telematics system 120 (e.g., by an end user device), the current status of the asset 102 can be provided, by extrapolation based on the most recently recorded data, within a known degree of precision, along with the amount of extrapolation error being assumed. If the current status of the asset 102 is significantly out of synch with the actual status of the asset 102 as per the data being collected at the asset 102, then a data logging trigger will be triggered at the asset 102, and a new simplified set of data 112 will be transmitted to the telematics system 120 so that the telematics system 120 can continue to extrapolate the current status of the asset 102 within a known degree of precision. As with interpolation error, a fixed amount of extrapolation error is achieved by considering the "vertical" deviation of each data point from the overall trend of the data while excluding the "horizontal" deviation made by the collection of such data over time.

A data sampling, reduction, filtering, or simplification algorithm that works in this manner may be advantageous in that it may improve the reliability of value estimation calculations performed on simplified sets of data (e.g., pursuant to requests made at the telematics system 120). Further, as will be seen below, this dataset simplification algorithm may also improve the richness of data collected in the areas that are likely to be of greatest interest.

FIG. 2A is an example data-time plot that shows three data points P1, P2, and P3, collected over time. Points P1, P2, and P3 may serve as a simplified example of the raw data 106 referred to in FIG. 1, which are to-be-simplified into a simplified set of data like the simplified set of data 112 of FIG. 1. The units of the X-axis and the Y-axis are omitted for simplicity, but it should be understood that the Y-axis represents the "data dimension" of any sort of data that is collected from the asset 102 (e.g., accelerometer data, vehicle speed data, engine RPM), and the X-axis represents the "time dimension" measured in minutes, seconds, or the like.

Point P2 is situated between points P1 and P3 (with respect to time), and there is a reference line drawn between P1 and P3. The distance from point P2 and the reference line P1-P3 may be determined in at least three ways: as a perpendicular distance Ep, as a vertical distance Ev, or as a horizontal distance Eh. As will be seen below, previous data simplification algorithms have considered the perpendicular distance Ep as being the relevant factor to determine whether the point P2 is sufficiently distant from the reference line P1-P3 to be included in the simplified set of data (e.g., algorithms based on the Ramer-Douglas-Peucker algorithm). According to the present disclosure, it is proposed that the vertical distance Ev be used instead, which provides the advantages discussed herein. If the vertical distance Ev is used, then the effects caused by the collection of the points P1, P2, and P3 over time are eliminated from consideration, which have been found to result in inconsistent amounts of value estimation error being associated with interpolation and extrapolation calculations made on the set of data. By considering the "vertical" distance between point P2 and the reference line P1-P3, the amount of interpolation error and extrapolation error can be fixed in advance, and it can be known how much deviation will be tolerated (measured in the units of the data being collected) by interpolation.

FIGS. 2B and 2C are illustrations comparing a vertical distance Ev and a perpendicular distance Ep to a reference line with a large slope versus a reference line with small slope. It should be seen that where there is a reference line with a large slope, as in the case of FIG. 2B, the vertical distance Ev is significantly greater than the perpendicular distance Ep. As a result, a data simplification algorithm that considers the vertical distance Ev rather than the perpendicular distance Ep may tend to be more sensitive to data points that are compared against reference lines with higher slopes, or, in other words, may capture more data points around data that is changing more quickly. It should also be seen that where there is a reference line with a small slope, as in the case of FIG. 2C, the vertical distance Ev is not significantly different from the perpendicular distance Ep. As a result, a data simplification algorithm that considers the vertical distance Ev rather than the perpendicular distance Ep may not tend to be more sensitive to data points that are compared against reference lines with lower slopes, or in other words, may not capture more data points around data that is changing more slowly. Thus, the dataset simplification algorithm proposed herein may improve the richness of data being collected around times when data is changing quickly, which may be the points in time that are of greatest interest.

Figure 3A:
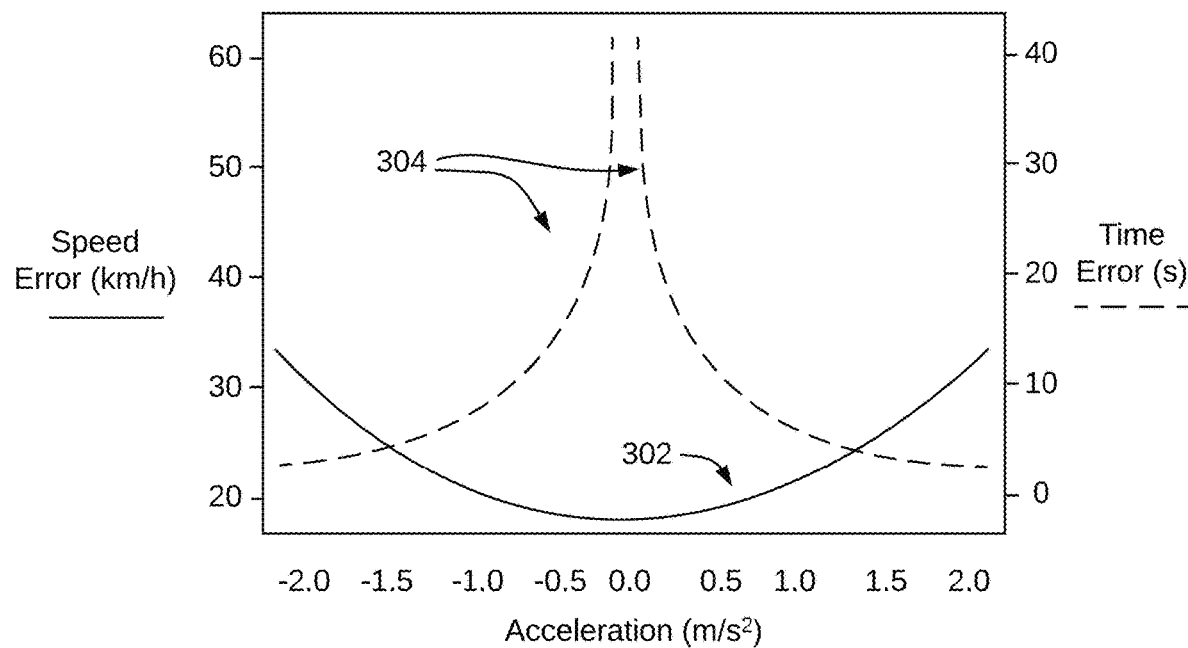
FIG. 3A is an example plot showing the amount of error associated with a value estimation calculation based on a set of data that was simplified according to a prior data simplification process. For comparison.

FIG. 3A is an example plot showing the amount of error associated with a value estimation calculation based on a set of data that was simplified according to a prior data simplification process. That is, a set of data that was simplified based on the perpendicular distance from a point to a reference line running through the set of data. In the present example, the first y-axis label on the left hand side represents speed error (km/h), the second y-axis label on the right hand side represents time error (s), and the x-axis label represents acceleration (m/s$^2$).

The plot shows a speed error curve 302, which is to be interpreted with reference to the speed error axis, that shows the amount of value estimation error associated with estimating speed at any given amount of acceleration. It can be seen that the amount of speed error being assumed at large levels of acceleration (whether positive or negative) is relatively high, while the amount of speed error being assumed at low levels of acceleration (whether positive or negative) is relatively low. That is, the amount of error associated with value estimation of speed changes depending on acceleration, and increases at greater levels of acceleration (when speed vs. time slope is large), resulting in an inconsistent error profile throughout the set of data.

The equation that defines the speed error curve 302 can be set out as Ev=Ep/cos(a tan(($\Delta$Y*rY)/($\Delta$X*rX))), where Ev represents the vertical distance from a point to-be-simplified to its reference line, Ep represents the perpendicular distance from the point to its reference line, $\Delta$Y represents change in the y-axis (speed), $\Delta$X represents change in the x-axis (time), and rY and rX are arbitrary speed and time factors, respectively, which are constants.

The plot also shows a time error curve 304, which is to be interpreted with reference to the time error axis, which shows the inverse relationship that the amount of time error being assumed at large levels of acceleration is relatively low, while the amount of time error being assumed at low levels of acceleration is relatively high.

The equation that defines the time error curve 304 can be set out as Eh=Ep/sin(a tan(($\Delta$Y*rY)/($\Delta$X*rX))), where Eh represents the horizontal distance from a point to-be-simplified to its reference line, Ep represents the perpendicular distance from the point to its reference line, $\Delta$Y represents change in the y-axis (speed), $\Delta$X represents change in the x-axis (time), and rY and rX are arbitrary speed and time factors, respectively, which are constants.

Figure 3B:
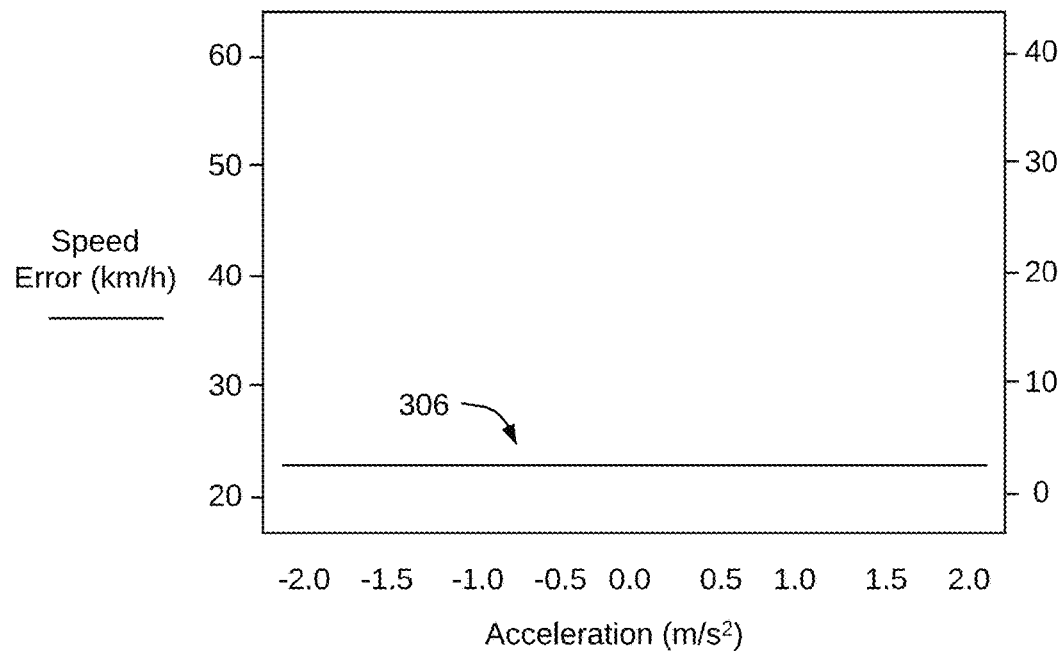
FIG. 3B is an example plot showing the amount of error associated with a value estimation calculation based on a set of data that was simplified based on the data simplification process disclosed herein.

For comparison, FIG. 3B is an example plot showing the amount of error associated with a value estimation calculation based on a set of data that was simplified based on the data simplification process disclosed herein. That is, a set of data that was simplified based on the vertical distance from a point to a reference line running through the set of data. The labelling of the plot in FIG. 3B is the same as the labelling of the plot in FIG. 3A.

The plot in FIG. 3B shows a speed error curve 306 that shows a constant amount of speed error being assumed regardless of the level of acceleration. That is, the amount of error associated with value estimation of speed does not change depending on acceleration, resulting in a consistent error profile throughout the set of data.

Although these plots show the amount of value estimation error associated with "speed vs. time" data, a similar relationship may be shown for other types of data (e.g., engine RPM vs. time, x-accelerometer vs. time, etc.). The plot shown in FIG. 3B is representative of the amount of value estimation error that may be associated with value estimation calculations based on data collected from the asset 102 of FIG. 1, as such data has passed through a fixed estimate error data simplification process.

A more detailed description of a dataset simplification algorithm that considers the perpendicular distance Ep as compared to a dataset simplification algorithm that considers the vertical distance Ev is provided throughout FIGS. 4A-11, below.

Figure 4A:
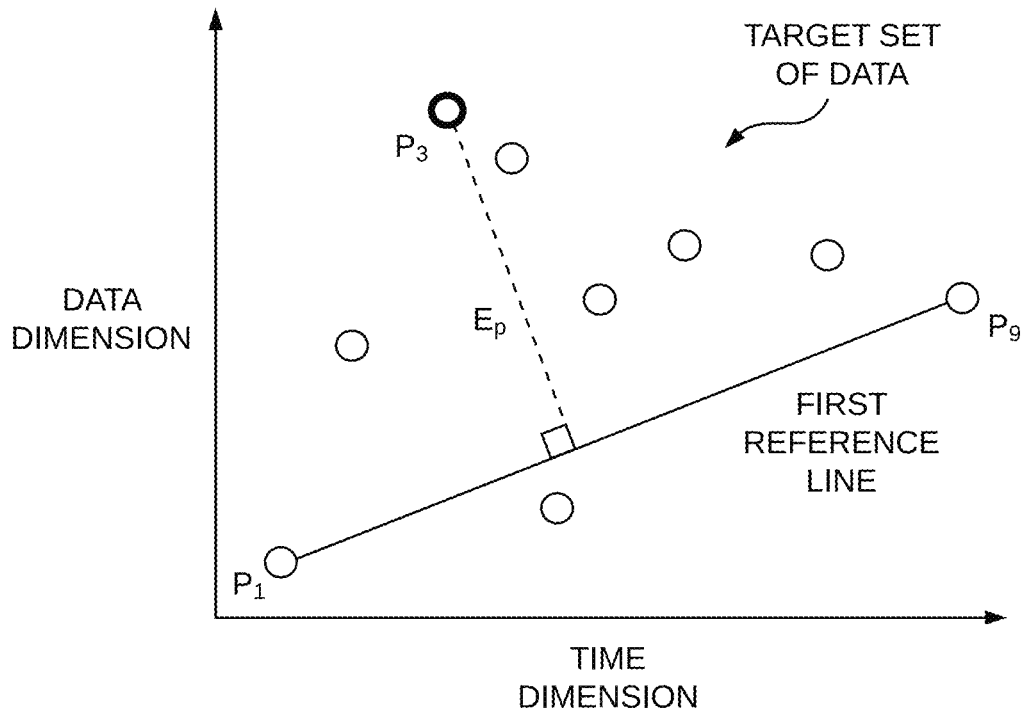
FIG. 4A is an example data-time plot of a set of data to be simplified by a dataset simplification algorithm based on the perpendicular distances from points to reference lines running through the set of data.

FIG. 4A is an example data-time plot of a set of data to be simplified by a dataset simplification algorithm based on consideration of the perpendicular distances Ep from various points to reference lines running through the set of data, in accordance with a previous dataset simplification algorithm. FIGS. 4B, 5A, 5B, and 6 are data-time plots that show further steps in that dataset simplification algorithm. The term "target set of data" may be used to describe any particular subset of the many types of data that may be included in the raw data collected at an asset which is to be considered separately for simplification. For example, one target set of data may be "vehicle speed vs. time", and another target set of data may be "engine RPM vs. time".

The data-time plot of FIG. 4A shows a number of data points collected over time. These data points may serve as a simplified example of the raw data 106 referred to in FIG. 1, which are to-be-simplified into a simplified set of data like the simplified set of data 112 of FIG. 1. The units of the X-axis and the Y-axis are omitted for simplicity, but it should be understood that the Y-axis represents the "data dimension" of any sort of data that is collected from the asset 102 (e.g., accelerometer data, vehicle speed data, engine RPM), and the X-axis represents the "time dimension" measured in minutes, seconds, or the like.

The first data point in the set is labelled P1, and the last data point is labelled P9. In accordance with a prior dataset simplification algorithm that considers the perpendicular distances Ep from points to reference lines (e.g., an algorithm based on the Ramer-Douglas-Peucker algorithm), the point P3 is determined to be the point in the data set with the greatest (perpendicular) distance Ep to the reference line P1-P9. That perpendicular distance is compared against a threshold simplification value. If that distance is larger than the threshold simplification value, point P3 is included in the simplified set of data. Assuming P3 is included in the simplified set of data, the dataset simplification algorithm proceeds to the state shown in FIG. 4B.

Figure 4B:
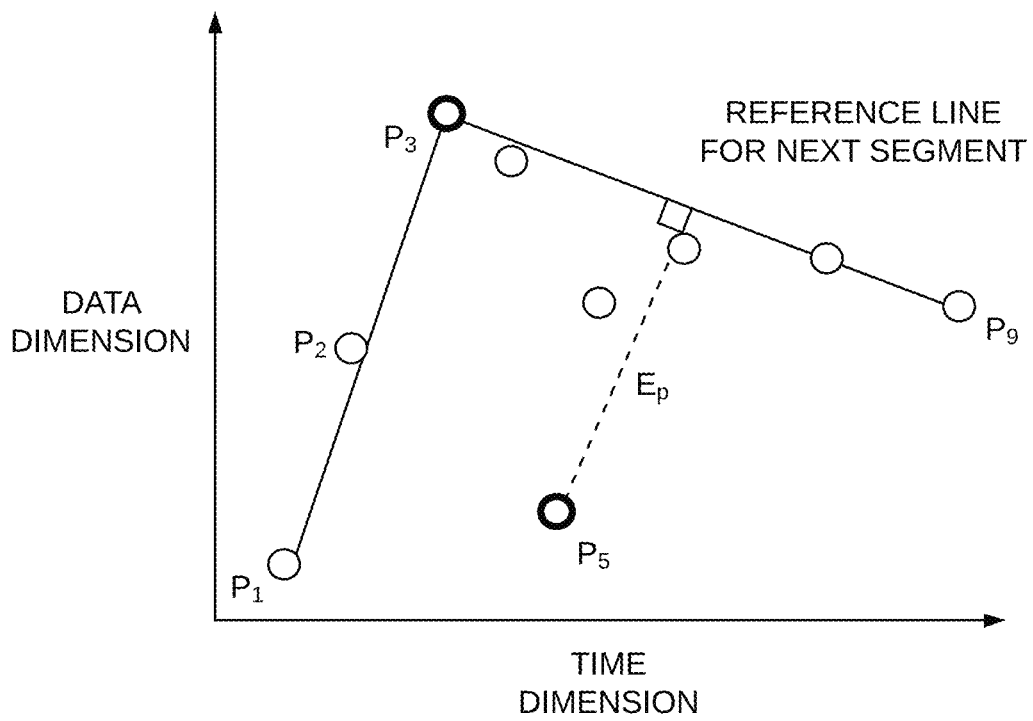
FIGS. 4B, 5A, 5B and 6A are data-time plots that show further steps in the dataset simplification algorithm.

In FIG. 4B, the target set of data is subdivided into two segments on either side of the previously-most-distant point P3. For each segment, a new reference line is defined between the first and last point in that segment, and it is determined whether the point in that segment that is most distant from the reference line of that segment in excess of the threshold simplification value. In the example shown, suppose that the point P2 is not sufficiently distant from the reference line P1-P3 to be included in the simplified set of data. However, suppose that the point P5 is sufficiently distant from the reference line P3-P9 to be included. The algorithm then proceeds to the state shown in FIG. 5A.

Figure 5A:
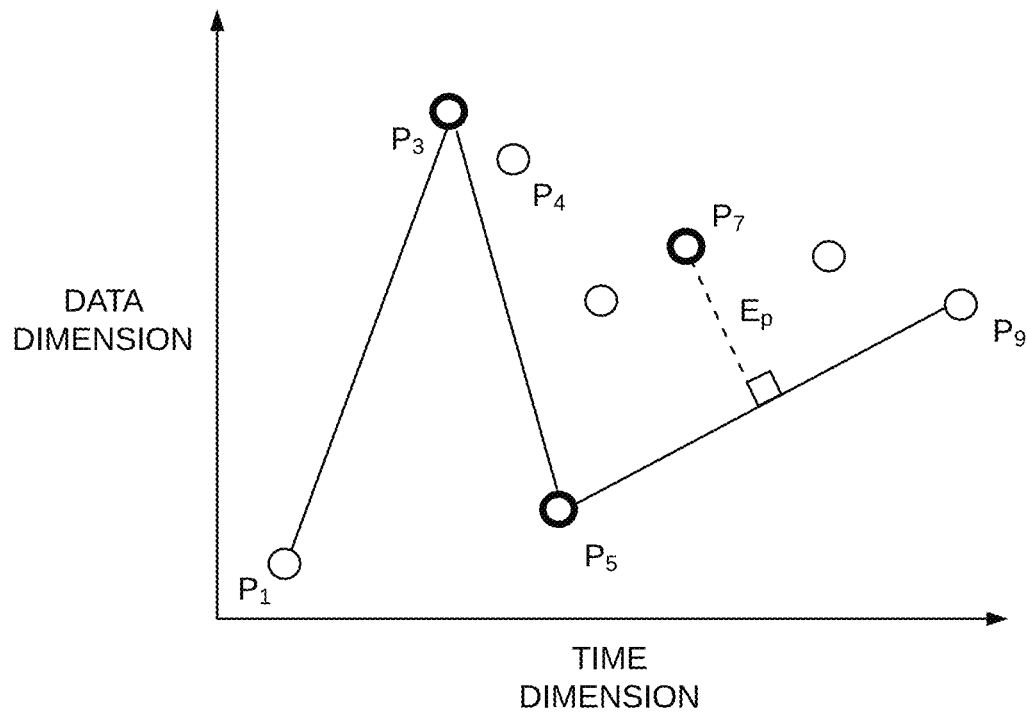

In FIG. 5A, the point P2 is discarded, and it can be seen that the segment defined between P1-P3 cannot be subdivided any further, as no further points for evaluation remain. However, the segment previously defined between P3-P9 is subdivided into segments with reference lines P3-P5 and P5-P9. Suppose that point P4 is not sufficiently distant from the reference line P3-P5 to be included in the simplified set of data. However, suppose that the point P7 is sufficiently distant from the reference line P5-P9 to be included. The algorithm then proceeds to the state shown in FIG. 5B.

Figure 5B:
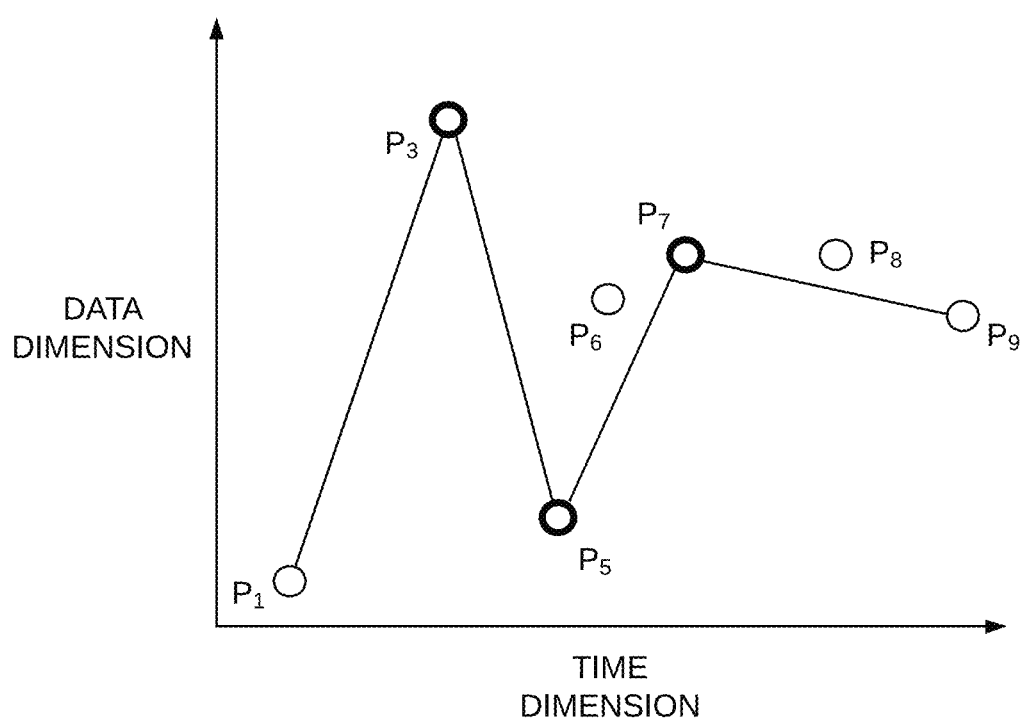

In FIG. 5B, the point P4 is discarded, and it can be seen that the segment defined between P3-P5 cannot be subdivided any further. Segments P5-P7 and P7-P9 are under consideration. However, suppose that point P6 is not sufficiently distant from reference line P5-P7 to be included in the simplified set of data, and that point P8 is not sufficiently distant from reference line P7-P9 to be included in the simplified set of data. Thus, points P6 and P8 are discarded.

Figure 6A:
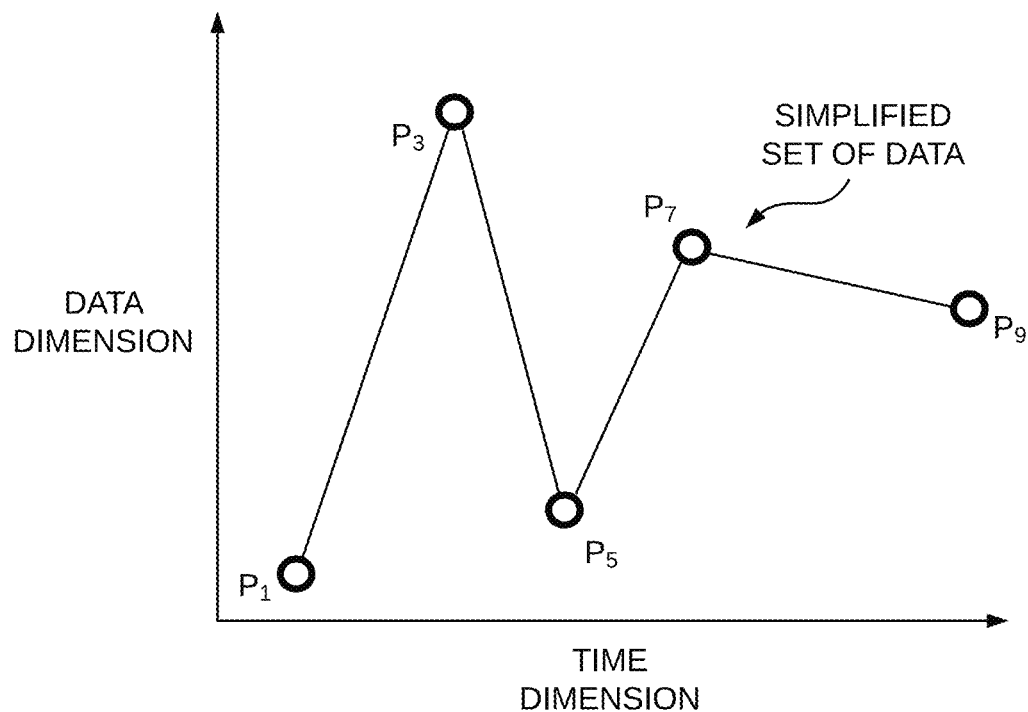

Thus, the resulting simplified set of data is as shown in FIG. 6A. Data points P1-P9 have been reduced to data points P1, P3, P5, P7, and P9. The simplified set of data may be transmitted, as in the case of the simplified set of data 112 of FIG. 1, to the telematics system 120. If an end user device were to make requests of the telematics system 120 for the status of the asset 102 at a point in time defined between any of these points (e.g., between points P1 and P3), the telematics system 120 may make an interpolation calculation to provide the requested status.

Figure 6B:
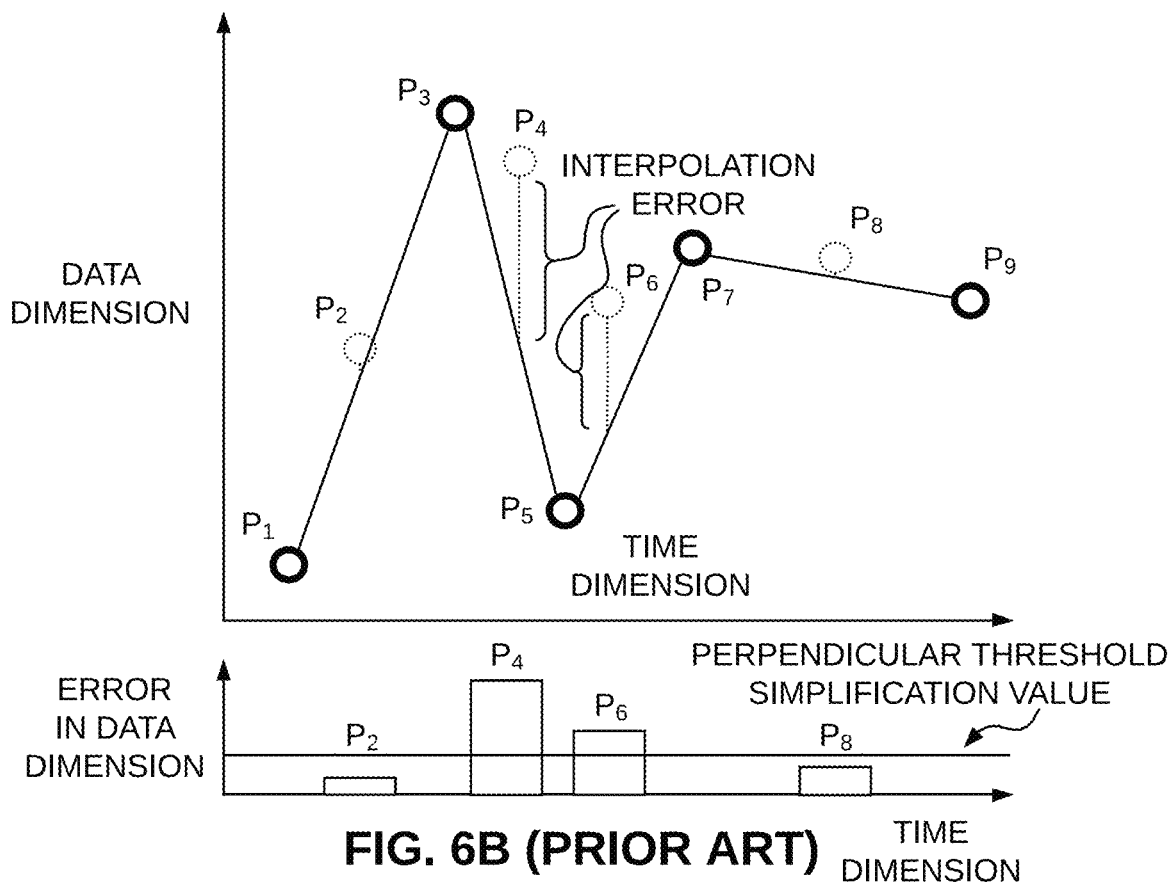
FIG. 6B is another data-time plot that shows the simplified set of data and the amount of interpolation error that results from the dataset simplification algorithm.

However, as discussed previously, any interpolation calculation made on a simplified set of data that was generated this way (using perpendicular distances Ep) will be associated with a variable amount of error that changes depending on how fast the underlying data was changing as it was recorded. There will be no fixed upper bound on interpolation error, as the upper bound on interpolation error changes throughout the data. Thus, any interpolated value between points P1 and P3, between which there is a relatively large slope, may be associated with a higher degree of interpolation error than any interpolated value between points P7 and P7, between which there is a relatively small slope. FIG. 6B shows the amount of interpolation error being assumed by the exclusion of points P2, P4, P6, and P8 from the simplified set of data. Not only is the amount of error being assumed inconsistent throughout the data set, but the actual amount of interpolation error being assumed by the end user is also not readily apparent to the end user—no definitive upper bound can be provided. Indeed, in some cases, since the vertical distance between a point and its associated reference line may be greater than the perpendicular distance between the point and its associated reference line, the amount of interpolation error being assumed may be larger than the stipulated allowable "perpendicular" error (i.e., the perpendicular threshold simplification value), as is the case with points P4 and P6. The end user may therefore lack confidence in the reliability of the interpolated value provided. This issue is overcome by following the dataset simplification process set out in FIGS. 7 to 11, below.

Figure 7:
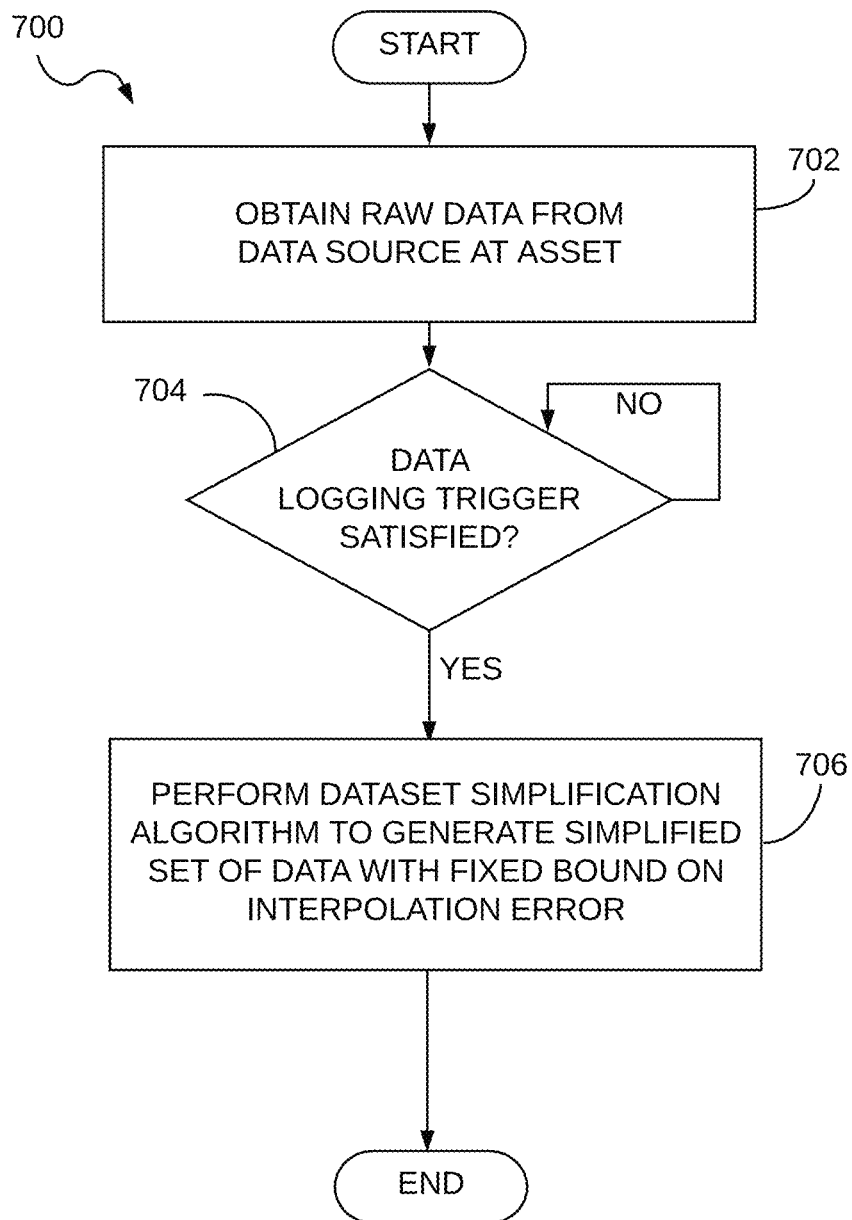
FIG. 7 is a flowchart of an example method for capturing a simplified set of data from an asset through a fixed estimation error data simplification process in which interpolation error within the simplified set of data is limited by an upper bound that is fixed across the simplified set of data.

FIG. 7 is a flowchart of an example method 700 for capturing a simplified set of data from an asset through a fixed estimation error data simplification process in which interpolation error within the simplified set of data is limited by an upper bound that is fixed across the simplified set of data. The method 700 may be understood to be one example of how data may be captured from the asset 102 of FIG. 1. Thus, for exemplary purposes, the method 700 will be described with reference to the asset 102 of FIG. 1. Further, certain details of the method 700 may be elaborated upon above within the description of FIG. 1 or elsewhere in this disclosure. The blocks of the method 700 may be performed by an integrated tracking system onboard the asset 102 or an asset tracking device coupled to the asset 102.

At block 702, raw data 106 is obtained from a data source 104 at the asset 102. At block 704, it is determined whether a data logging trigger is satisfied. A data logging trigger may include a determination of how much one or more recently collected data points at the asset deviates from the trend of the data (discussed in greater detail later in this disclosure), a determination that a memory buffer that temporarily stores raw data 106 prior to simplification is filled, a determination that a timer has expired, or another suitable trigger. Such data logging triggers are continually checked, and once one is satisfied, block 706 is executed.

At block 706, a dataset simplification algorithm is performed on the raw data 106 to generate a simplified set of data 112 in which interpolation error is limited by an upper bound that is fixed across the simplified set of data 112. Generating the simplified set of data 112 may involve including a point from a target set of data in the simplified set of data 112 if the point is distant, along a data dimension of the target set of data (i.e., "vertically"), from a reference line running through the target set of data, in excess of a threshold simplification value. This process is described in greater detail in FIG. 8, below.

Figure 8:
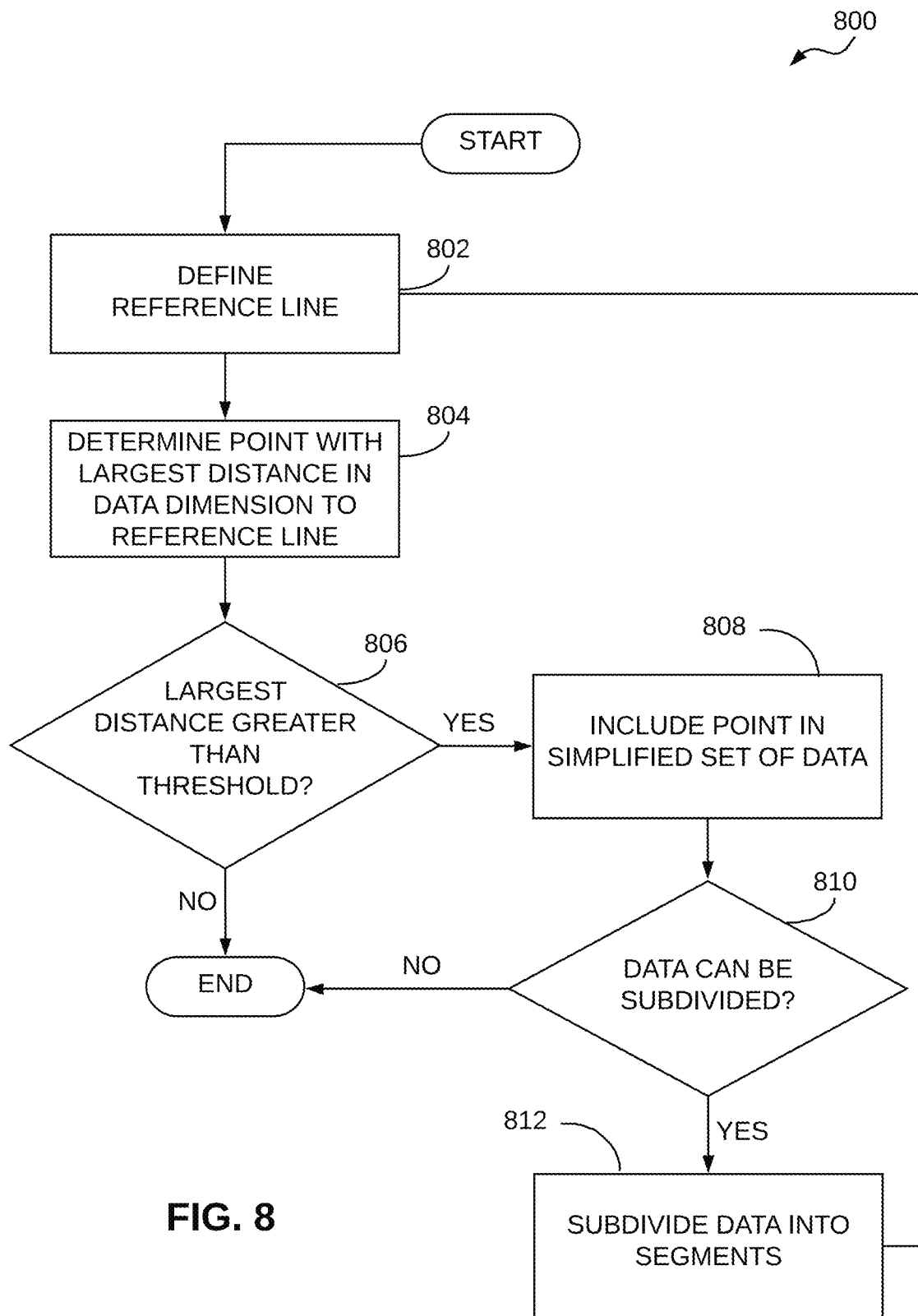
FIG. 8 is a flowchart of an example method for generating a simplified set of data in which interpolation error within the simplified set of data is limited by an upper bound that is fixed across the simplified set of data.

FIG. 8 is a flowchart of an example method 800 for simplifying a target set of data to generate a simplified set of data in which interpolation error within the simplified set of data is limited by an upper bound that is fixed across the simplified set of data. The method 800 may be understood to be one example of how the block 706 of the method 700 of FIG. 7 may be performed. Thus, for exemplary purposes, the method 700 will be described with reference to the asset 102 of FIG. 1, and for the purposes of the method 800, it is assumed that the raw data 106 includes a target set of data that is recorded over time.

The method 800 will first be described briefly here, and for further illustrative purposes, the method 800 will then be described with reference to FIGS. 9A-11, which contrast the application of the dataset simplification algorithm of the method 800 to the prior dataset simplification algorithm illustrated in FIGS. 4A-6. The blocks of the method 800 may be performed by an integrated tracking system onboard the asset 102 or an asset tracking device coupled to the asset 102.

At block 802, a first reference line is defined through the target set of data from a first point in the target set of data to a last point in the target set of data with respect to time. The reference line may be a straight line defined by linear interpolation, a curve defined by polynomial interpolation, or another reference line defined by another means. At block 804, it is determined which point in the target set of data is most distant, along a data dimension of the target set of data (i.e., "vertically"), from the first reference line. At block 806, it is determined whether the most distant point is distant from the first reference line, along the data dimension, in excess of a threshold simplification value. If that distance is greater than the threshold simplification value, that most distant point is included in the simplified set of data 112, at block 808. If that distance is less than the threshold simplification value, the point being evaluated is discarded.

At block 810, after a point was included in the simplified set of data 112, it is determined whether the remaining data can be subdivided into smaller segments for further simplification. If the remaining data cannot be subdivided into smaller segments (e.g., if all possible segments of data points have been considered), the method 800 is ended. If the data can be further subdivided, then the data is subdivided into smaller segments at block 812, and the blocks 802-812 are repeated to iteratively subdivide the target set of data into smaller segments. The steps of determining the point of greatest distance and comparing that distance against a threshold to determine whether that point is to be included in the simplified set of data 112 are repeated iteratively. Each new segment will be bounded by either the first point in the target set of data, a point that was previously included in the simplified set of data, or the last point in the target set of data, as the case may be. For each segment, a new reference line defined between the first point bounding that segment and the last point bounding that segment to be used as the respective reference line for that segment. This process continues iteratively until there are no further points in any segment that are distant from its respective reference line, along the data dimension, in excess of the threshold simplification value.

The method 800 may be repeated for several separate target sets of data. For example, the method 800 may be performed on "vehicle speed vs. time" and again on "engine RPM vs. time", and so on. Further, the method 800 may be performed on a multidimensional set of data with multiple data dimensions. That is, the raw data may include a target set of data that includes a plurality of data streams recorded over time, and generating the simplified set of data may involve including a point from the target set of data in the simplified set of data if the point is distant, along at least one data dimension of the target set of data, from a reference line running through the target set of data, in excess of a threshold simplification value that corresponds to that data dimension. For example, a target set of data may include "x-accelerometer data, y-accelerometer data, and z-accelerometer data vs. time", which includes three data dimensions and one time dimension. That target set of data may be simplified taking into consideration the deviation of each data point in any of the dimensions (x, y, or z) from reference lines. The threshold simplification value may be configured for each data dimension separately. For example, the threshold simplification value for motion in the x- and y-direction may be 0.5 g, whereas the threshold simplification value for motion in the z-direction may be 0.1 g, so that the dataset simplification algorithm is more sensitive to deviations in accelerometer data in the z-direction.

Any of the resulting simplified sets of data, multidimensional or otherwise, may be bundled together and transmitted to the telematics system 120. The raw data that is to-be-considered for simplification may be stored in a temporary memory buffer prior to application of the dataset simplification algorithm, and may be "saved" on a separate memory (or on a separately partitioned portion of the same memory) prior to transmission to the telematics system 120. The memory buffer may be continually refreshed to make room for new raw data after a previous set of raw data has been simplified.

Further, any of the "first" and "last" points in each target set of data may be forced to be included in the simplified set of data, where appropriate. In some examples, the final points included in any given simplified set of data may be included for consideration in the next to-be-simplified set of data in a "run-on" dataset simplification algorithm so that adjacent simplified sets of data are smoothed over.

Figure 9A:
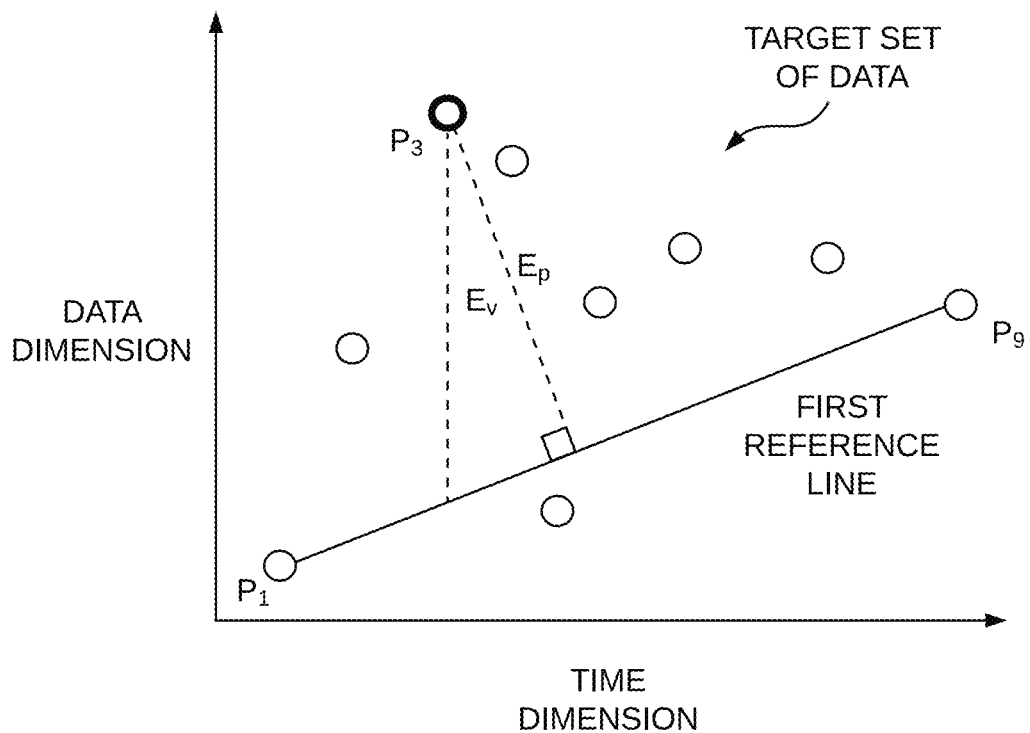
FIG. 9A is an example data-time plot of a set of data to be simplified by a dataset simplification algorithm based on the vertical distances of point to reference lines running through the set of data.

With reference to FIGS. 9A-11B, application of the method 800 is described in greater detail. FIG. 9A is an example data-time plot of a target set of data to be simplified by a dataset simplification algorithm based on consideration of the vertical distances Ev from various points to reference lines running through the target set of data, in accordance with the method 800. FIGS. 9B, 10A, 10B, and 11A are data-time plots that show further steps in that dataset simplification algorithm. The term "target set of data" is used to describe any particular subset of the many types of data that may be included in the raw data, collected at an asset, which is to be considered separately for simplification.

The data-time plot of FIG. 9A shows a number of data points collected over time. These data points may serve as a simplified example of the raw data 106 referred to in FIG. 1, which are to-be-simplified into a simplified set of data like the simplified set of data 112 of FIG. 1. The units of the X-axis and the Y-axis are omitted for simplicity, but it should be understood that the Y-axis represents the "data dimension" of any sort of data that is collected from the asset 102

(e.g., accelerometer data, vehicle speed data, engine RPM), and the X-axis represents the "time dimension" measured in minutes, seconds, or the like.

The first data point in the set is labelled P1, and the last data point is labelled P9. A first reference line is defined between points P1 and P9. It is determined that the point P3 is the point in the data set with the greatest (vertical) distance Ev to the reference line P1-P9. That vertical distance is compared against a threshold simplification value. If that distance is larger than the threshold simplification value, point P3 is included in the simplified set of data. Assuming P3 is included in the simplified set of data, the dataset simplification algorithm proceeds to the state shown in FIG. 9B. The perpendicular distance Ep is shown for comparison to the vertical distance Ev for reference only.

Figure 9B:
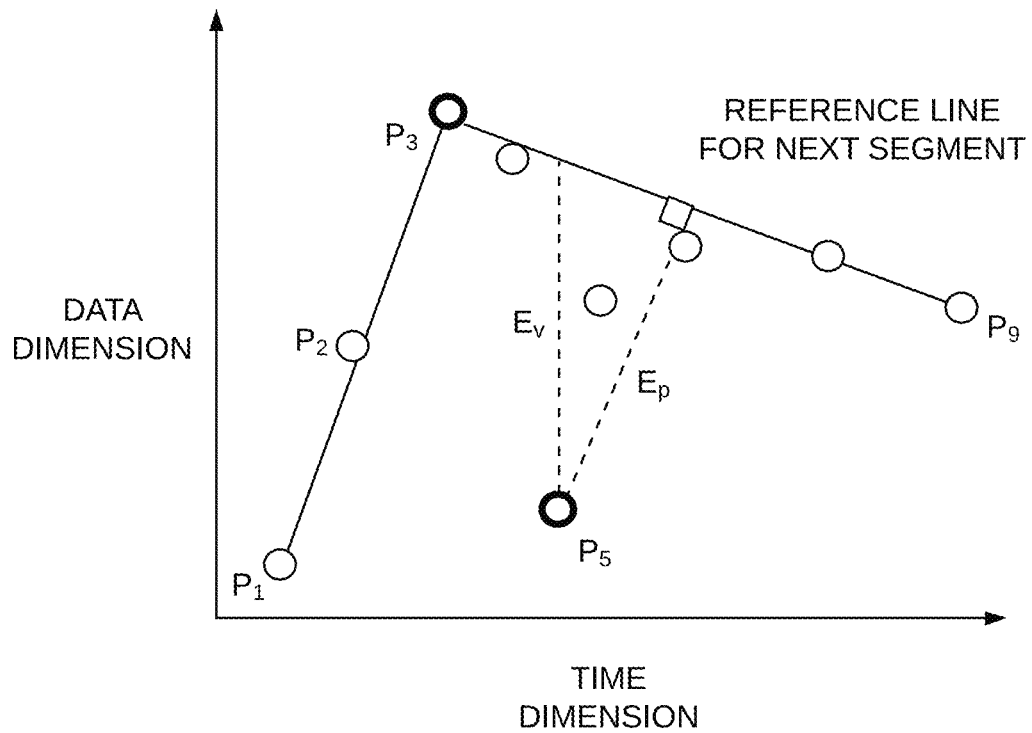
FIGS. 9B, 10A, 10B, and 11A are data-time plots that show further steps in the dataset simplification algorithm.

In FIG. 9B, the target set of data is subdivided into two segments on either side of the previously-most-distant point P3. For each segment, a new reference line is defined between the first and last point in that segment, and it is determined whether the point in that segment that is most vertically-distant from the reference line of that segment is distant from that reference line in excess of the threshold simplification value. In the example shown, suppose that the point P2 is not sufficiently distant from the reference line P1-P3 to be included in the simplified set of data. However, suppose that the point P5 is sufficiently vertically-distant from the reference line P3-P9 to be included. The algorithm then proceeds to the state shown in FIG. 10A.

Figure 10A:
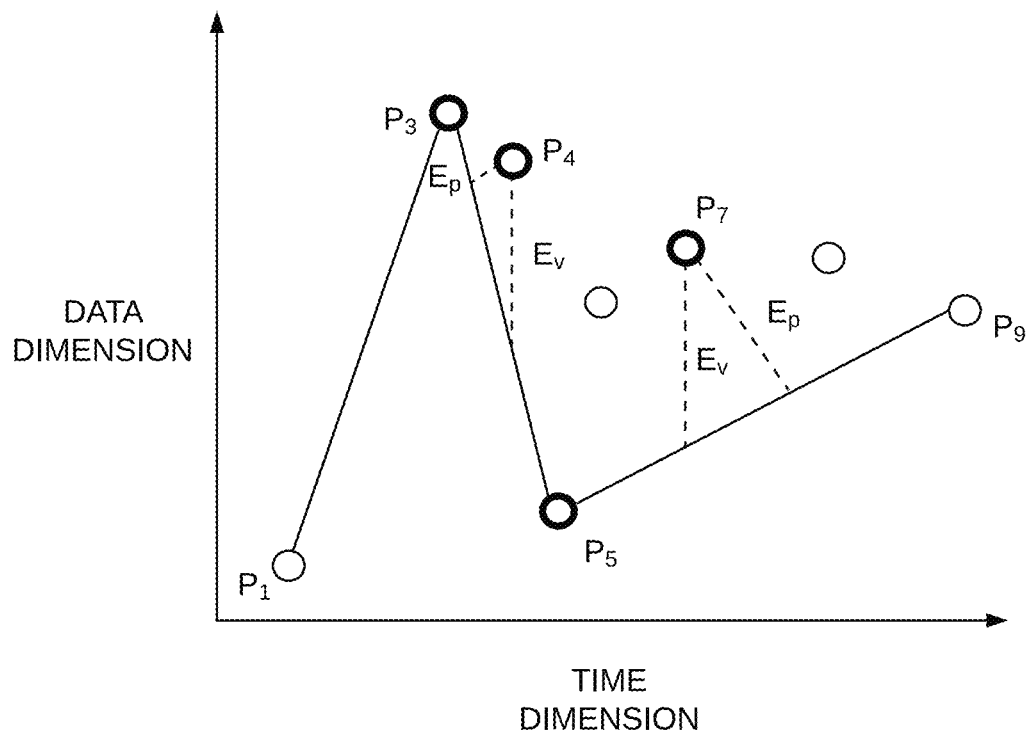

In FIG. 10A, the point P2 is discarded, and it can be seen that the segment defined between P1-P3 cannot be subdivided any further. However, the segment previously defined between P3-P9 is subdivided into segments with reference lines P3-P5 and P5-P9.

Next, note that point P4 is substantially vertically-distant from the reference line P3-P5, but is not very perpendicularly-distant from the reference line P3-P5. Suppose that P4 is sufficiently vertically-distant from the reference line to be included in the simplified set of data. Thus, P4 may be taken as an example of a point that would be included in the simplified set of data under an algorithm that considers vertical distances, but would not be included in the simplified set of data under an algorithm that considers perpendicular distances. Note also that the point P4 is in an area of the target set of data where the data is changing rapidly. The reference line P3-P5 is of substantially large (steep) slope.

Consider the point P7, which has a similar vertical distance to the reference line P5-P9 as a perpendicular distance. Suppose that the point P7 is sufficiently vertically-distant from its reference line to be included in the simplified set of data. The algorithm then proceeds to the state shown in FIG. 10B.

Figure 10B:
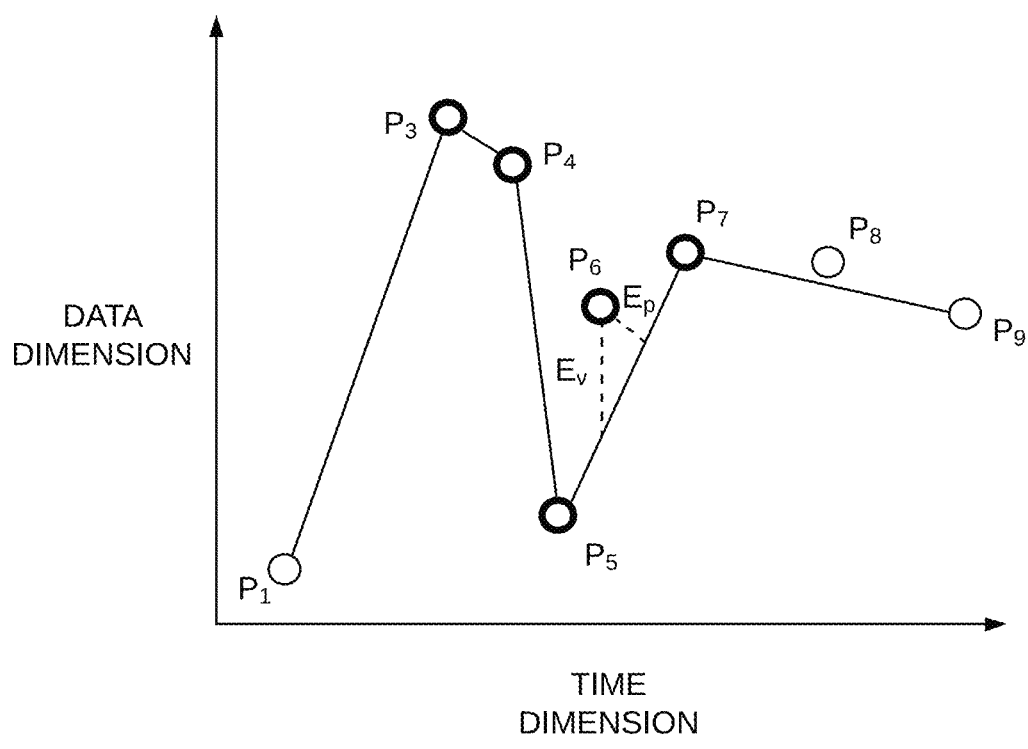

In FIG. 10B, it can be seen that the segment defined between P3-P5 cannot be subdivided any further, as all points within that segment have been included in the simplified set of data. Segments P5-P7 and P7-P9 are under consideration. Suppose that point P8 is not sufficiently distant from the reference line P7-P9 to be included in the simplified set of data. However, note that point P6 is substantially more vertically-distant from the reference line P5-P7 than it is perpendicularly-distant. Take point P6 as another example of a point that would be included in the simplified set of data under an algorithm that considers vertical distances, but would not be included in the simplified set of data under an algorithm that considers perpendicular distances. Again, note that the point P6 is in an area of the target set of data where the data is changing rapidly.

Figure 11A:
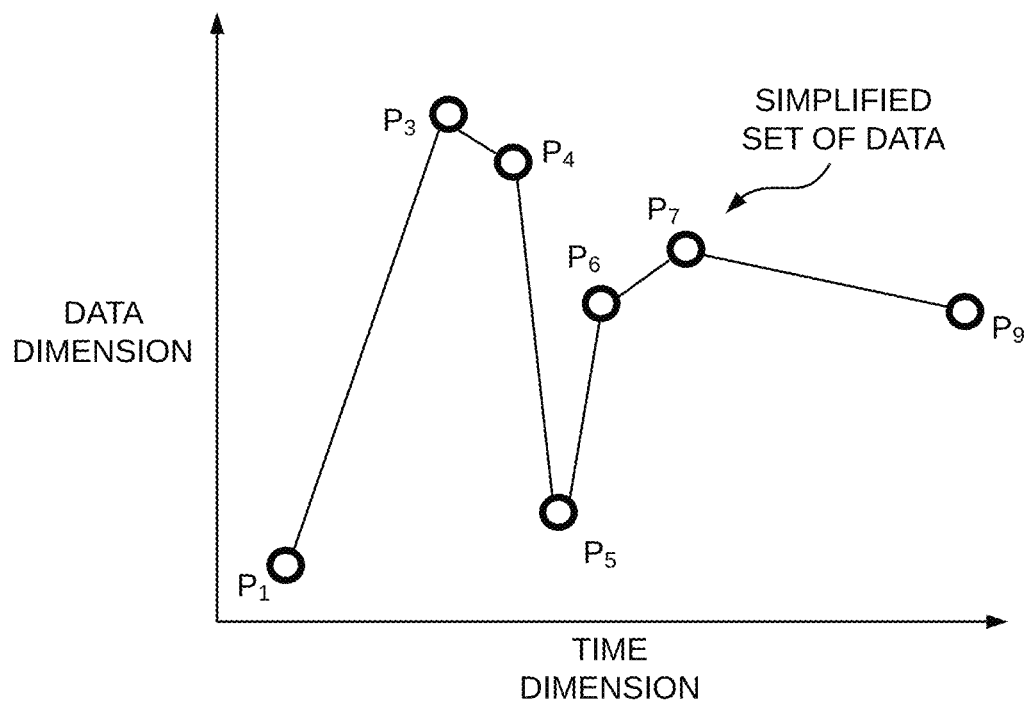

There are no further points to be considered. Thus, the resulting simplified set of data is as shown in FIG. 11A. Data points P1-P9 have been reduced to data points P1, P3, P4, P5, P6, P7, and P9. The simplified set of data may be transmitted, as in the case of the simplified set of data 112 of FIG. 1, to the telematics system 120. If an end user device were to make requests of the telematics system 120 for the status of the asset 102 at a point in time defined between any of these points (e.g., between points P1 and P3), the telematics system 120 may make an interpolation calculation to provide the requested status.

Figure 11B:
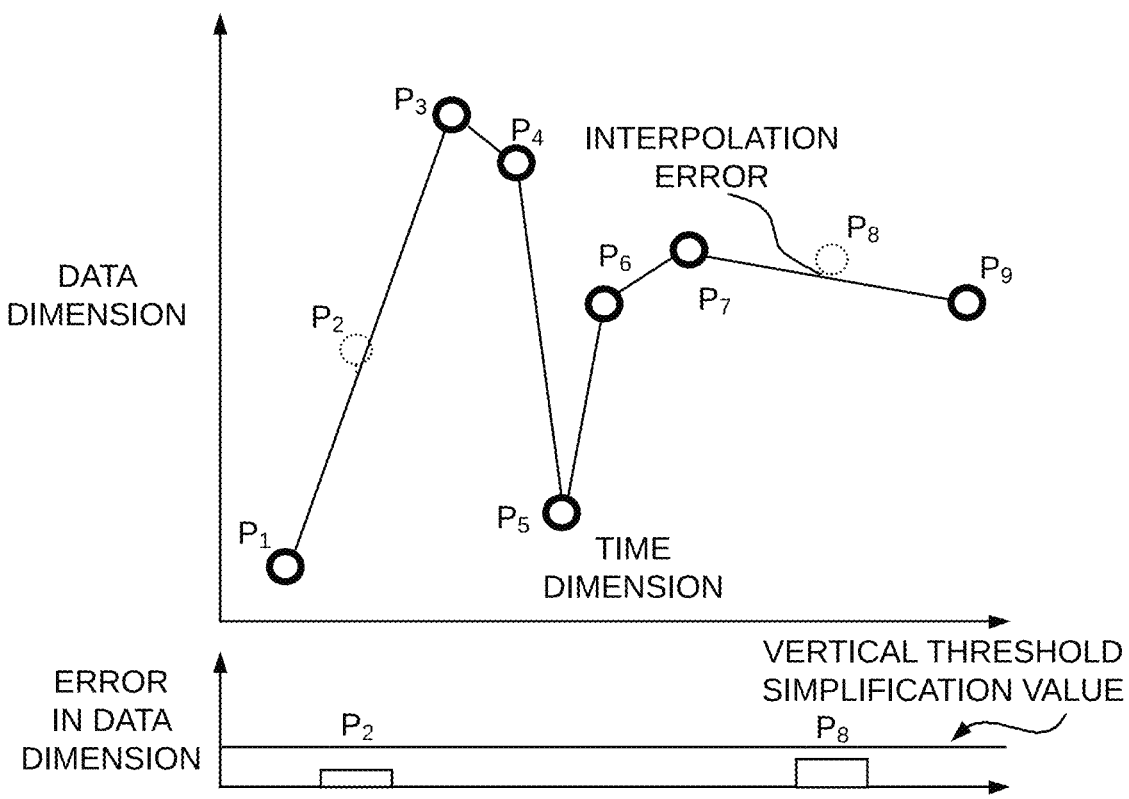
FIG. 11B is another data-time plot that shows the simplified set of data and the amount of interpolation error that results from the dataset simplification algorithm.

However, in contrast to the approach described in FIGS. 4A-6, which involves the consideration of perpendicular distances between points and reference lines, the amount of interpolation error that is associated with any interpolation calculation within the simplified set of data is limited by an upper bound that is fixed across the simplified set of data. This upper bound is directly determined by the threshold simplification value. FIG. 11B shows the amount of interpolation error being assumed by the exclusion of points P2 and P8 from the simplified set of data. The amount of interpolation error is less than the stipulated allowable "vertical" error (i.e., the vertical threshold simplification value). If any given data point deviated from its reference line in excess of that threshold simplification value then that data point would have been included in the simplified set of data. These reference lines that are used for dataset simplification are identical to the lines that are ultimately used for interpolation. Therefore, it can be reasonably concluded that no raw data points were collected at the asset that deviate from any interpolated value in excess of the threshold simplification value. For example, if data being collected was "vehicle speed vs. time" data, and the threshold simplification value was defined as "2.0 km/h", then any interpolated speed of the asset can be assumed to be accurate within 2.0 km/h.

Further, the simplified set of data generated here includes a greater number of points around data that is changing quickly, namely points P4 and P6, which were excluded from the simplified set of data derived by the approach described in FIGS. 4A-6B. The approach described herein may tend to capture more points around data that is changing quickly, and therefore may provide greater insights into the most interesting periods of data collected at an asset.

The raw data shown in FIGS. 4A-6B and here in FIGS. 9A-11B is shown for exemplary purposes only, and was designed to highlight the differences in outcome between the two approaches described. The section of raw data shown includes a section in which the data being collected is changing quickly, and thus there is a discernible difference in outcome between the two approaches. However, it is to be understood that other sets of raw data may include sections in which the data is changing quickly as well as areas in which the data is not changing quickly. In areas in which the data is not changing quickly, it is expected that the approach described in FIGS. 9A-11B will not result in significantly more or fewer data points being captured than the approach described in FIGS. 4A-6B. This is because in areas in which the raw data is not changing quickly, the slopes of reference lines defined between such data points will be low, and the difference between any perpendicular distance Ep and vertical distance Ev between points in the raw data and such reference lines will be nearly the same. Thus, the dataset simplification algorithm described in FIGS. 9A-11B may capture a greater number of points around data that is changing quickly, without capturing more or fewer points around data that is not changing quickly.

Further, since data points are included in the simplified set of data based on the vertical distance of each point to a reference line, the threshold simplification value is not impacted by the collection of data over time. In other words, the shortest vertical line between any data point and its reference line has no time component. In this way, the threshold simplification value can be defined in units that match, or at least are in the same domain as, the units of the data dimension (y-axis) of a plot of the data. For example, in the simplification of an "engine RPM vs. time" dataset, the threshold simplification value can be defined in units of RPM, or some factor directly related to RPM. This is in contrast to prior dataset simplification algorithms which consider the perpendicular distance Ep from points to reference lines, where the "threshold value" used inherently includes both a data component (e.g., engine RPM) and a time component (e.g., seconds), and therefore is not definable in units that match, or even in the same domain as, the units of the data dimension (y-axis) of a plot of the data. Thus, under dataset simplification algorithms that consider perpendicular distances, the amount of value estimation error that is being assumed is best described as a unitless distance, which has a time component and a data component that vary in relation to one another depending on the slope of the reference line being compared to. The use of these prior algorithms has involved the use of arbitrary "time factors" and "data factors" in which the data and/or time dimension of the data are multiplied by factors to stretch or skew the data to account for these effects and to achieve a desired simplification outcome based on trial and error testing of the suitability of different "factors" to different data types. The amount of value estimation error that is being assumed cannot be clearly communicated to an end user as "10 RPM", for example. In contrast, under dataset simplification algorithms that consider vertical distances, advantageously, the amount of value estimation error that is being assumed can be intuitively communicated to an end user (e.g., as "10 RPM"), and manipulation of the data by the application and testing of arbitrary "factors" is unnecessary. This value can be clearly understood by an end user and considered in the analysis of value estimations made on simplified data, and may improve an end user's confidence in the reliability of such data.

While the techniques described above may be applied to the simplification of datasets and the interpolation of values within such datasets to obtain historical statuses of an asset, similar techniques described below may be applied to the triggering of the dataset simplification algorithms and the extrapolation of values outside of such datasets to obtain real-time status updates.

Figure 12A:
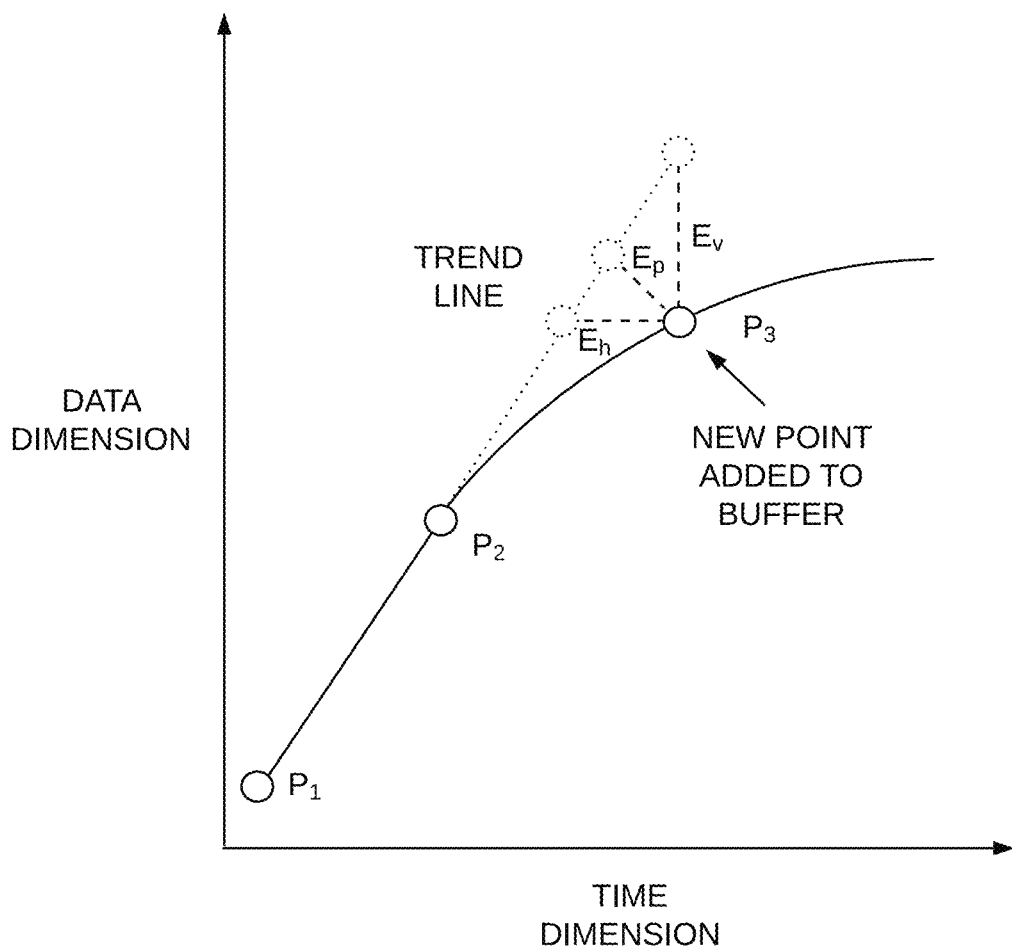
FIG. 12A is an example data-time plot that shows the vertical, perpendicular, and horizontal distances from a point to a trend line.

FIG. 12A is an example data-time plot that shows three data points P1, P2, and P3, collected over time. P1 and P2 represent data points from data that has been previously simplified and recorded at a telematics system like the telematics system 120 of FIG. 1 (e.g., after passing through a dataset simplification algorithm). Point P3 represents the next raw data point collected at the asset (e.g., added to a buffer), like the asset 102 of FIG. 1, but prior to undergoing a dataset simplification process, and prior to being transmitted to the telematics system 120. The units of the X-axis and the Y-axis are omitted for simplicity, but it should be understood that the Y-axis represents the "data dimension" of any sort of data that is collected from the asset 102 (e.g., accelerometer data, vehicle speed data, engine RPM), and the X-axis represents the "time dimension" measured in minutes, seconds, or the like.

There is a trend line P1-P2 that is shown extended past P2 in a dotted line to represent an extrapolated prediction of the status of the asset after point P2. If an end user device were to make a request to the telematics system 120 for the status of the asset after the point P2, the telematics system 120 may return a value as predicted by this extrapolated line, and may continue to do so until its records are updated with a new simplified set of data. A new simplified set of data will not be transmitted to the telematics system 120 until satisfaction of a data logging trigger at the asset 102. Although there may be many different types of data logging triggers, one such data logging trigger is based on a comparison of data points recently collected at the asset (e.g., point P3) to the trend extrapolated from line P1-P2. Under one such data logging trigger, if the point P3 deviates too far off from the predicted extrapolated value, a dataset simplification algorithm is run on the newly collected points, and the resulting simplified set of data is transmitted to the telematics system 120.

The distance from point P3 and the extrapolated line past P1-P2 may be determined in at least three ways: as a perpendicular distance Ep, as a vertical distance Ev, or as a horizontal distance Eh. As will be seen below, previous dataset simplification algorithms have considered the perpendicular distance Ep as being the relevant factor to determine whether the point P3 is sufficiently distant from the extrapolated line past P1-P2 to satisfy a data logging trigger (e.g., algorithms based on the Ramer-Douglas-Peucker algorithm). According to the present disclosure, it is proposed that the vertical distance Ev be used instead, which provides the advantages discussed herein. If the vertical distance Ev is used, then the effects caused by the collection of the points P1, P2, and P3 over time are eliminated from consideration, which have been found to result in inconsistent amounts of value estimation error being associated with interpolation and extrapolation calculations made on the set of data. By considering the "vertical" distance between point P3 and the extrapolated line past P1-P2, the amount of extrapolation error can be fixed in advance, and it can be known in advance how much deviation (measured in the units of the data being collected) will be tolerated before a data logging trigger is satisfied.

Figure 12B:
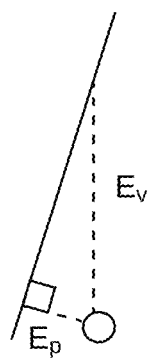
FIGS. 12B and 12C are illustrations comparing vertical distance to perpendicular distances from a point to line with a large slope and a line with small slope.
Figure 12C:
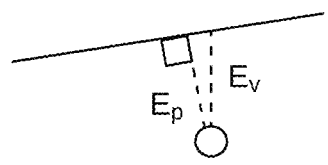

FIGS. 12B and 12C are illustrations comparing a vertical distance Ev and a perpendicular distance Ep to a trend line with a large slope versus a trend line with small slope. It should be seen that where there is a trend line with a large slope, as in the case of FIG. 12B, the vertical distance Ev is significantly different from the perpendicular distance Ep. As a result, a data logging trigger that considers the vertical distance Ev rather than the perpendicular distance Ep may tend to be satisfied more often when newly collected data points are compared against trend lines with higher slopes, or, in other words, in data that is changing more quickly. It should also be seen that where there is a trend line with a small slope, as in the case of FIG. 12C, the vertical distance Ev is not significantly different from the perpendicular distance Ep. As a result, a data logging trigger that considers the vertical distance Ev rather than the perpendicular distance Ep will not tend to be satisfied more often when newly collected data points are compared against trend lines with lower slopes, or in other words, when data is changing more slowly. Thus, the data logging algorithm proposed herein may improve the frequency with which data is simplified around times when data is changing quickly, thereby providing more up-to-date data to the telematics system when changes in the data are of greatest interest.

Figure 13A:
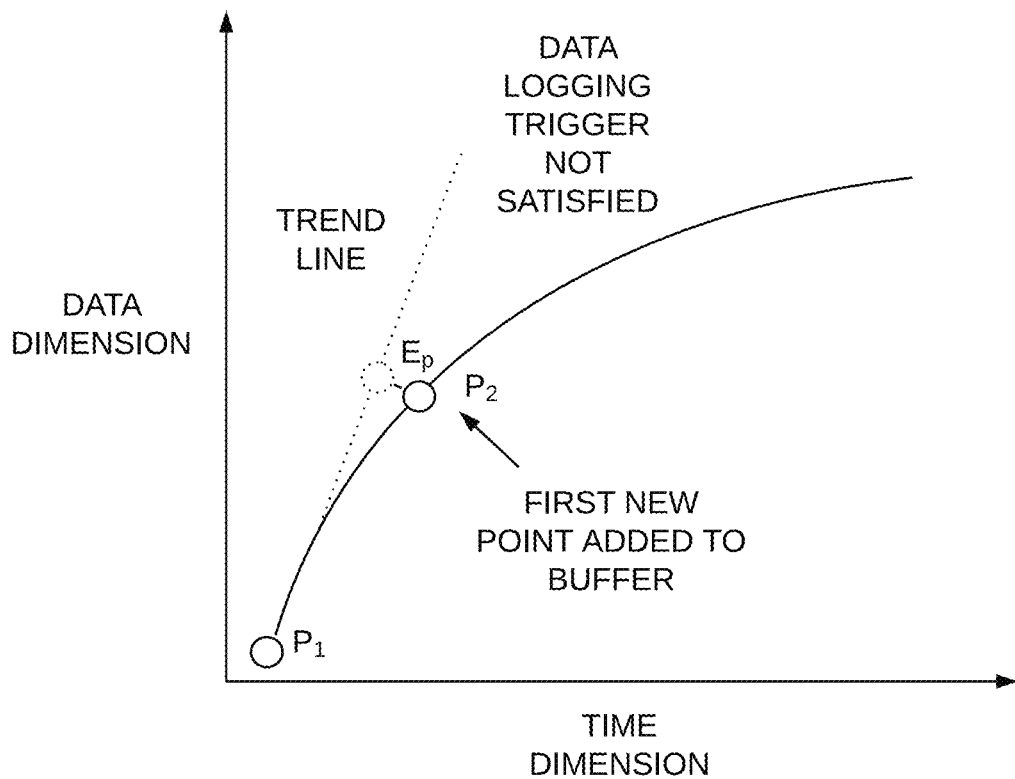
FIG. 13A is an example data-time plot showing a new data point being collected and compared against a line that was extrapolated from the most recently recorded points for satisfaction of a data logging trigger based on perpendicular distance from the new data point to the extrapolated line.
Figure 13B:
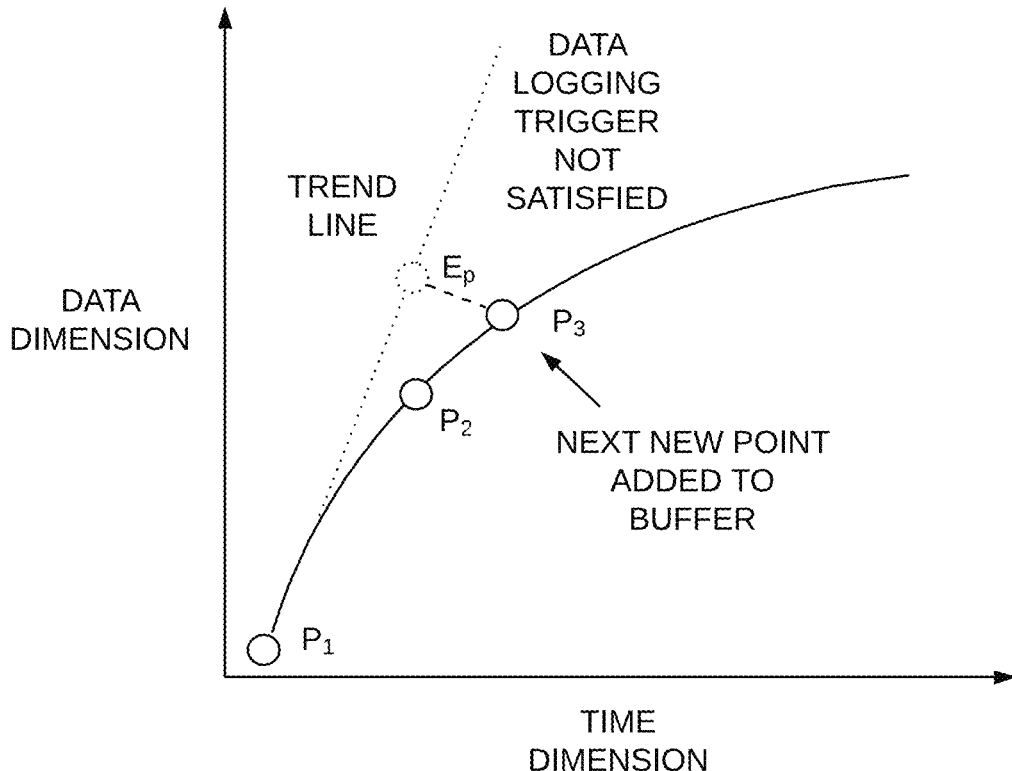
FIGS. 13B and 14 are data-time plots that show further new data points being collected and compared against the extrapolated line.
Figure 14:
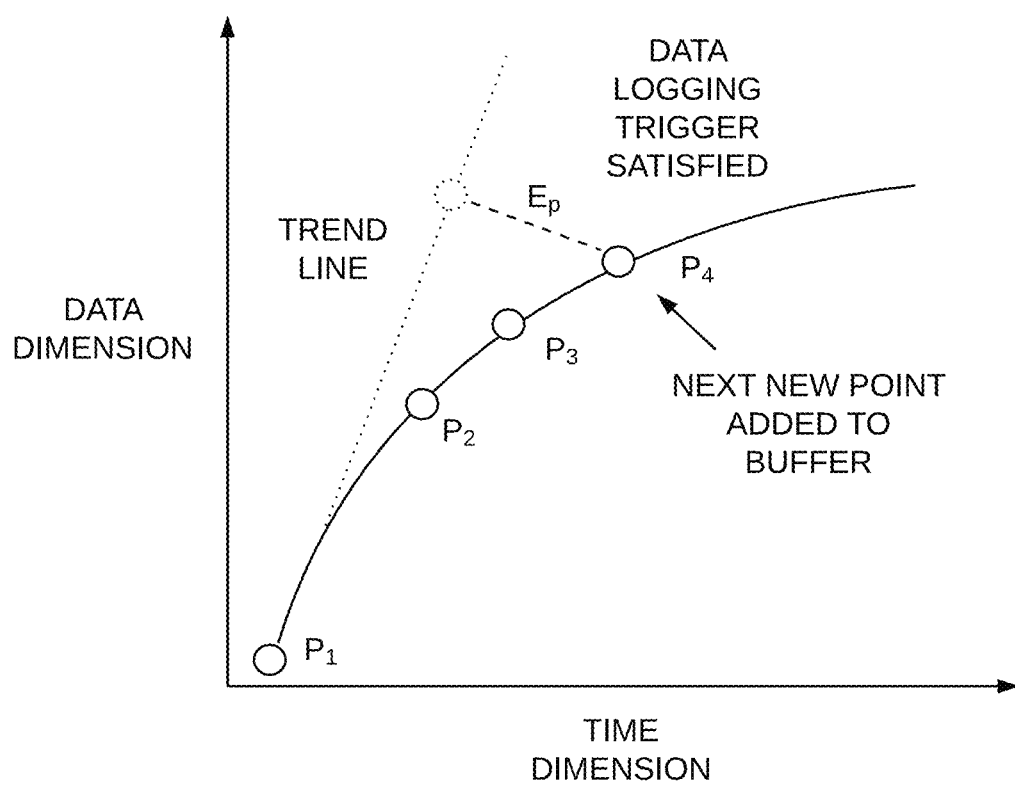

FIG. 13A is an example data-time plot of a new data point being collected and compared against a line that was extrapolated from the most recently recorded points for satisfaction of a data logging trigger based on based on a perpendicular distance from the new data point to the extrapolated line, in accordance with a previous data simplification algorithm. FIGS. 13B and 14 are data-time plots that show further new data points being collected and compared against the extrapolated line. The term "target set of data" is used to describe any particular subset of the many types of data that may be included in the raw data, collected at an asset, which is to be considered separately for simplification.

The data-time plot of FIG. 13A shows a first point P1, which represents the last data point from the most recently simplified set of data recorded at a telematics system like the telematics system 120 of FIG. 1 (e.g., after passing through a dataset simplification algorithm). A trend line is defined through P1 which represents the most recent trend in the data (e.g., calculated by linear extrapolation based on P1 and one or more earlier saved points). P2 is a new raw data point collected at an asset, like the asset 102 of FIG. 1. Point P2 represents the first data point in a new set of raw data 106 that is to be simplified into a simplified set of data like the simplified set of data 112 of FIG. 1 upon satisfaction of a data logging trigger. The units of the X-axis and the Y-axis are omitted for simplicity, but it should be understood that the Y-axis represents the "data dimension" of any sort of data that is collected from the asset 102 (e.g., accelerometer data, vehicle speed data, engine RPM), and the X-axis represents the "time dimension" measured in minutes, seconds, or the like.

In FIG. 13A, the newly added point P2 is compared against the trend line. That is, the perpendicular distance Ep is calculated between P2 and the trend line. If the calculated distance is greater than a threshold trigger value, a data logging trigger will be satisfied. Suppose that the calculated distance is too short, and no data logging trigger is yet satisfied. In the meantime, if the telematics system 120 were requested to provide a current status of the asset 102, it may provide an extrapolated estimate based on the extrapolated trend line. Data collection at the asset 102 continues, and the data simplification algorithm proceeds to the state shown in FIG. 13B.

In FIG. 13B, a next newly added point P3 is collected and compared against the trend line. As above, suppose the calculated perpendicular distance Ep is less than the threshold trigger value, and thus no data logging trigger is satisfied. In the meantime, if the telematics system 120 were requested to provide a current status of the asset 102, it may still provide an extrapolated estimate based on the extrapolated trend line. Data collection at the asset 102 continues, and the data simplification algorithm proceeds to the state shown in FIG. 14.

In FIG. 14, a next newly added point P4 is collected and compared against the trend line. Here, suppose the calculated perpendicular distance Ep is greater than the threshold trigger value, and thus a data logging trigger is satisfied. The newly collected raw data 106, that is, P2, P3, and P4, may then be passed through a dataset simplification algorithm to generate a simplified set of data 112 for transmission to the telematics system 120. Thus, if the telematics system 120 were requested to provide a current status of the asset 102, it may provide an extrapolated estimate based on a newly defined trend line based on the more recently simplified data.

However, if the determination of whether a newly collected point at the asset 102 deviates sufficiently far from the trend of the recorded data is made on the basis of the perpendicular distance Ep of the newly collected point to the trend line, then the determination of whether a new dataset simplification algorithm is to be triggered will be inherently biased by the nature of the data as it is being collected (e.g., how quickly the data is changing), or in other words, based on how large or small the slope of the trend line is. This results in uncertainty as to what threshold amount of deviation from the trend will be tolerated before the telematics system 120 is updated with a new set of simplified data 112. Since the telematics system 120 will continue to provide extrapolated data in response to requests for the status of the asset 102 until a new simplified set of data 112 is received, an end user may therefore lack confidence that the extrapolated prediction provided is within a tolerable error threshold. This issue is overcome by following the data simplification process set out in FIGS. 15 to 17B, below.

Figure 15:
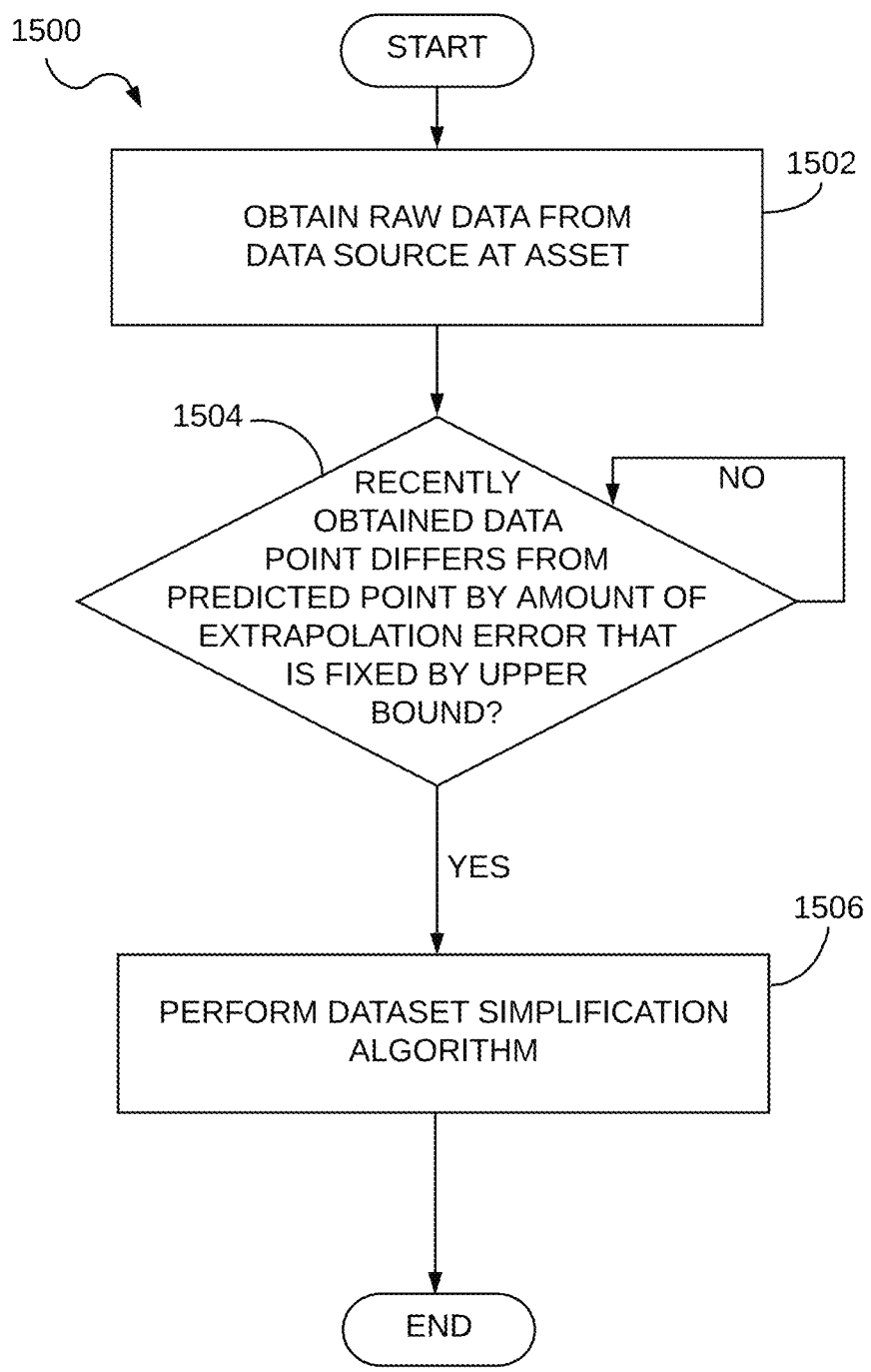
FIG. 15 is a flowchart of an example method for capturing a simplified set of data from an asset when a data logging trigger is satisfied based on comparison of a newly collected data point against a line that was extrapolated from the most recently recorded points based on vertical distance from the new data point to the extrapolated line.

FIG. 15 is a flowchart of an example method 1500 for determining that a data logging trigger is satisfied based on comparison of a newly collected data point against a line that was extrapolated from the most recently recorded points based on vertical distance from the new data point to the extrapolated line. The method 1500 may be understood to be one example of how data may be captured from the asset 102 of FIG. 1. Thus, for exemplary purposes, the method 1500 will be described with reference to the asset 102 of FIG. 1. Further, certain details of the method 1500 may be elaborated upon above within the description of FIG. 1 or elsewhere in this disclosure. The blocks of the method 1500 may be performed by an integrated tracking system onboard the asset 102 or an asset tracking device coupled to the asset 102.

At block 1502, raw data 106 is obtained from a data source 104 at the asset 102. At block 1504, it is determined whether a data logging trigger is satisfied. The data logging trigger is determined to be satisfied by determining that a recently obtained point in the raw data 106 differs from a corresponding predicted point predicted by extrapolation based on previously saved points included in one or more previously generated simplified sets of data by an amount of extrapolation error that is limited by an upper bound that is fixed as the raw data 106 is collected over time. Determining whether the data logging trigger is satisfied may involve determining that a recently obtained point in a target set of data is distant, along a data dimension of the target set of data, from a trend line running through the target set of data, in excess of a threshold trigger value. This process is described in greater detail in FIG. 16, below. At block 1506, when the data logging trigger is satisfied, a dataset simplification algorithm is performed on the raw data 106 to generate a simplified set of data 112.

Figure 16:
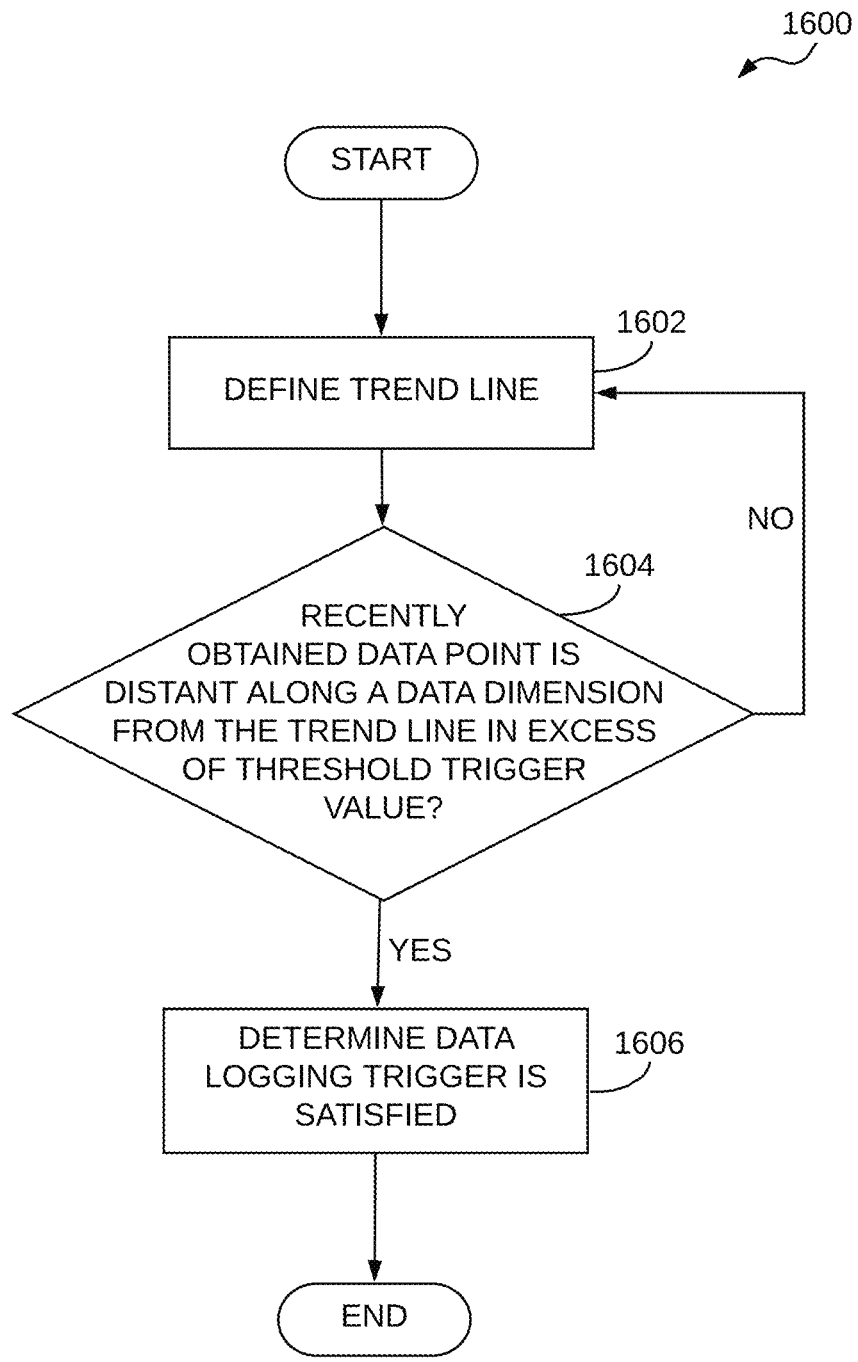
FIG. 16 is a flowchart of an example method for determining that a data logging trigger is satisfied based on comparison of a newly collected data point against a line that was extrapolated from the most recently recorded points based on vertical distance from the new data point to the extrapolated line.

FIG. 16 is a flowchart of an example method 1600 for determining whether a data logging trigger is satisfied by considering whether a recently obtained data point differs from a predicted point by an amount of extrapolation error that is fixed by an upper bound as raw data is collected. The method 1600 may be understood to be one example of how the block 1504 of the method 1500 of FIG. 15 may be performed. Thus, for exemplary purposes, the method 1600 will be described with reference to the asset 102 of FIG. 1, and it will be assumed that the raw data 106 includes a target set of data that is recorded over time. The term "target set of data" is used to describe any particular subset of the many types of data that may be included in the raw data, collected at an asset, which is to be considered separately for simplification.

The method 1600 will first be described briefly here, and for further illustrative purposes, the method 1600 will then be described with reference to FIGS. 17A-17B, which contrast the application of the data logging algorithm of the method 1600 to the prior data logging algorithm illustrated in FIGS. 13A-14. The blocks of the method 1600 may be performed by an integrated tracking system onboard the asset 102 or an asset tracking device coupled to the asset 102.

At block 1602, a trend line is defined through one or more previously obtained points in the target set of data. The trend line may be a straight line defined by linear extrapolation, a curve defined by polynomial extrapolation, or another trend line defined by another means. At block 1604, it is determined whether the recently obtained point is distant, along the data dimension, from the trend line, in excess of a threshold trigger value. At block 1606, if the recently obtained point is distant, along the data dimension, from the trend line, in excess of the threshold trigger value, then it is determined that the data logging trigger is satisfied.

The method 1600 may be ongoing and performed on a continuous basis as new raw data 106 is collected at the asset 102 and on several separate target sets of data. For example, the method 1600 may be performed on "vehicle speed vs. time" and again on "engine RPM vs. time", and so on, as such raw data 106 is collected. Further, the method 1600 may be performed on a multidimensional set of data with multiple data dimensions. That is, the raw data 106 may include a target set of data that includes a plurality of data streams recorded over time, and determining that the data logging trigger is satisfied may involve determining that a recently obtained point is distant, along at least one data dimension of the target set of data, from a trend line running through the target set of data, in excess of a threshold trigger value that corresponds to that data dimension. For example, a target set of data may include "x-accelerometer data, y-accelerometer data, and z-accelerometer data vs. time", which includes three data dimensions and one time dimension. That target set of data may trigger generation of a new simplified set of data 112 by taking into consideration the deviation of each data point in any of the dimensions (x, y, or z) from the trend line defined through such a target set of data. The threshold trigger value may be configured for each data dimension separately. For example, the threshold trigger value for motion in the x- and y-direction may be 0.5 g, whereas the threshold trigger value for motion in the z-direction may be 0.1 g, so that a dataset simplification algorithm is run more frequently in response to deviations in accelerometer data in the z-direction.

Figure 17A:
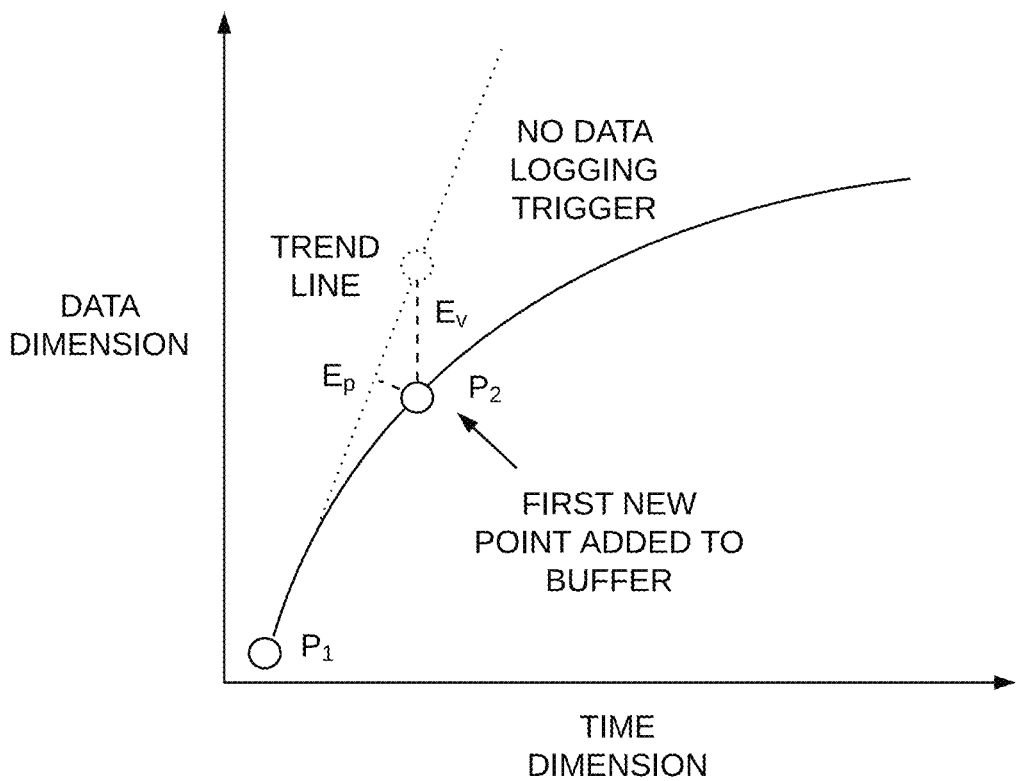
FIG. 17A is an example data-time plot of a new data point being collected and compared against a line that was extrapolated from the most recently recorded points for satisfaction of a data logging trigger based on vertical distance from the new data point to the extrapolated line.
Figure 17B:
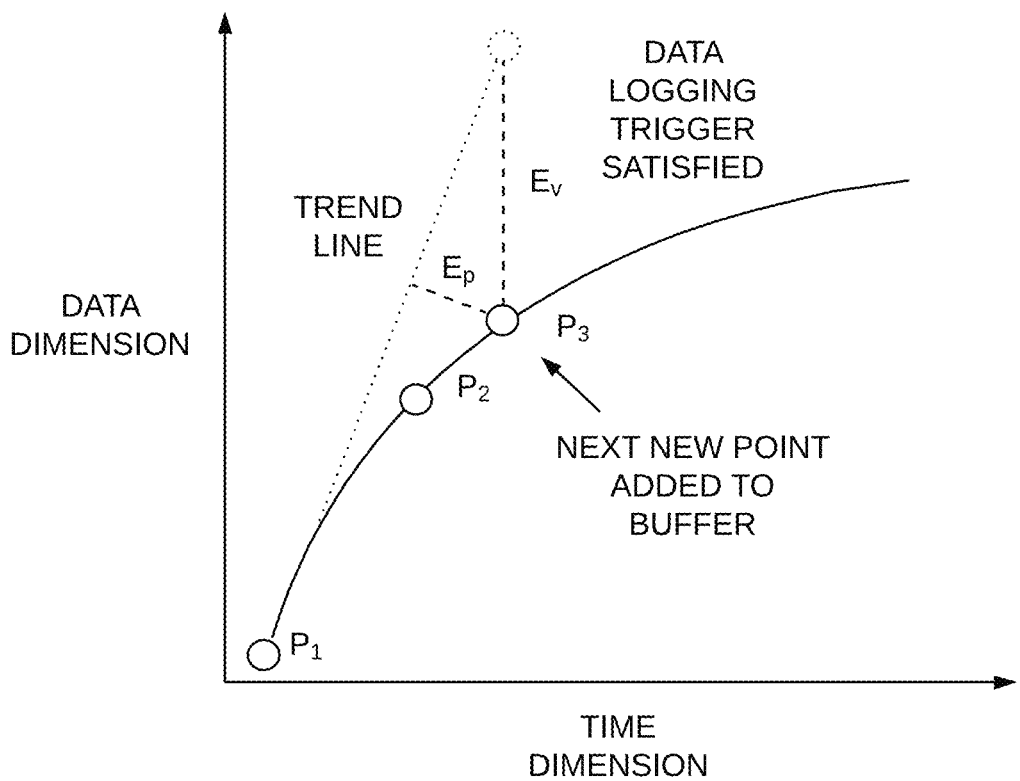
FIG. 17B is a data-time plot that shows a further new data point being collected and compared against the extrapolated line.

With reference to FIGS. 17A-17B, application of the method 1600 is described in greater detail. FIG. 17A is an example data-time plot of the collection of new data points into a target set of data. A trend line passing through point P1, a previously saved point, is shown. A newly collected data point P2 is also shown, which deviates from the trend line by both a perpendicular distance Ep and a vertical distance Ev. The units of the X-axis and the Y-axis are omitted for simplicity, but it should be understood that the Y-axis represents the "data dimension" of any sort of data that is collected from the asset 102 (e.g., accelerometer data, vehicle speed data, engine RPM), and the X-axis represents the "time dimension" measured in minutes, seconds, or the like.

The target set of data is to be simplified when the vertical distance Ev of a newly collected data point (e.g, point P2) to the trend line exceeds a threshold trigger value. The perpendicular distance Ep is shown for reference only. When a threshold trigger value is exceeded, a data logging trigger is executed, and a dataset simplification algorithm is performed on the recently collected points of data (i.e., in the buffer) to generate a simplified set of data like the simplified set of data 112 of FIG. 1.

Note that the vertical distance Ev is substantially greater than the perpendicular distance Ep. Thus, note that, given the trend line and newly collected raw data shown, where the trend line has a relatively large slope, a threshold trigger value is more likely to be exceeded in the vertical direction rather than the perpendicular direction. However, for present purposes, suppose that point P2 is not sufficiently vertically distant from the trend line to satisfy the data logging trigger.

In FIG. 17B, a second new data point, P3, is collected, and compared against the trend line. The vertical distance Ev is substantially greater than the perpendicular distance Ep. Suppose now that the point P3 is sufficiently vertically distant from the trend line to satisfy the data logging trigger. Thus, a dataset simplification algorithm is run on the newly collected raw data. Take P3 as an example of a newly collected raw data point that may have satisfied a data logging trigger that considers the vertical deviation of the point from the trend line, but would not have satisfied a data logging trigger that considers the perpendicular deviation of the point from the trend line. Once simplified, the simplified set of data may be transmitted, as in the case of the simplified set of data 112 of FIG. 1, to the telematics system 120, and the telematics system 120 will receive updated simplified data that can be used to provide more accurate estimations of the current status of the asset 102.

However, in contrast to the approach described in FIGS. 13A-4, which involves the consideration of perpendicular distances between newly collected points and trend lines, the amount of extrapolation error that is associated with any extrapolation calculation based on the simplified set of data is limited by an upper bound that is fixed across the simplified set of data. This upper bound is directly determined by the threshold trigger value. If any newly collected data point deviated from the trend line in excess of that threshold trigger value then a new simplified set of data would have been generated and updated information would have been provided to the telematics system. The extrapolated lines that are used for determining whether a data logging trigger is satisfied at the asset are identical to the lines that are used for extrapolation at the telematics system to provide the current status of an asset. Therefore, it can be reasonably concluded that no new raw data points have been collected at the asset that deviate from the extrapolated trend line in excess of the threshold trigger value. For example, if data being collected was "vehicle speed vs. time" data, and the threshold trigger value was defined as "2.0 km/h", then any extrapolated speed of the asset can be assumed to be accurate within 2.0 km/h.

The raw data shown in FIGS. 17A-17B is shown for exemplary purposes only, and was designed to highlight the differences in outcome between the two approaches described. The section of raw data shown is a section in which the data being collected is changing quickly, and thus there is a discernible difference in outcome between the two approaches. However, it is to be understood that other sets of raw data may include areas in which the data is changing quickly as well as areas in which the data is not changing quickly. In areas in which the data is not changing quickly, it is expected that the approach described in FIGS. 17A-17B will not result in data logging triggers being satisfied significantly more or less frequently than in the approach described in FIGS. 13A-14. This is because in areas in which the raw data is not changing quickly, the slopes of reference lines defined between such data points will be low, and the difference between any perpendicular distance Ep and vertical distance Ev between points in the raw data and such reference lines will be nearly the same. Thus, the data simplification algorithm described in FIGS. 17A-17B may be more sensitive, and cause data logging triggers to be satisfied more frequently around data that is changing quickly, without changing the rate of capture around data that is not changing quickly.

Further, since newly collected data points trigger the generation of new simplified sets of data based on the vertical deviation of each point to a trend line, the threshold trigger value is not impacted by the collection of data over time. In other words, the shortest vertical line between any data point and the extrapolated trend line has no time component. In this way, the threshold trigger value can be defined in units that match, or are at least in the same domain as, the units of the data dimension (y-axis) of a plot of the data. For example, in the logging of an "engine RPM vs. time" dataset, the threshold trigger value can be defined in units of RPM, or some factor directly related to RPM. This is in contrast to prior data logging algorithms which consider the perpendicular distance Ep from points to trend lines, where the "threshold value" used inherently includes both a data component (e.g., engine RPM) and a time component (e.g., seconds), and therefore is not definable in units that match, or even in the same domain as, the units of the data dimension (y-axis) of a plot of the data. Thus, under data logging algorithms that consider perpendicular distances, the amount of value estimation error that is being assumed is best described as a unitless distance, which has a time component and a data component that vary in relation to one another depending on the slope of the trend line being compared to. The use of these prior algorithms has involved the use of arbitrary "time factors" and "data factors" in which the data and/or time dimension of the data are multiplied by factors to stretch or skew the data to account for these effects and to achieve a desired simplification outcome based on trial and error testing of the suitability of different "factors" to different data types. The amount of value estimation error that is being assumed cannot be clearly communicated to an end user as "10 RPM", for example. In contrast, under data logging algorithms that consider vertical distances, advantageously, the amount of value estimation error that is being assumed can be intuitively communicated to an end user (e.g., as "10 RPM"), and manipulation of the data by the application and testing of arbitrary "factors" is unnecessary. This value can be clearly understood by an end user and considered in the analysis of value estimations made on simplified data, and may improve an end user's confidence in the reliability of such data.

Figure 18:
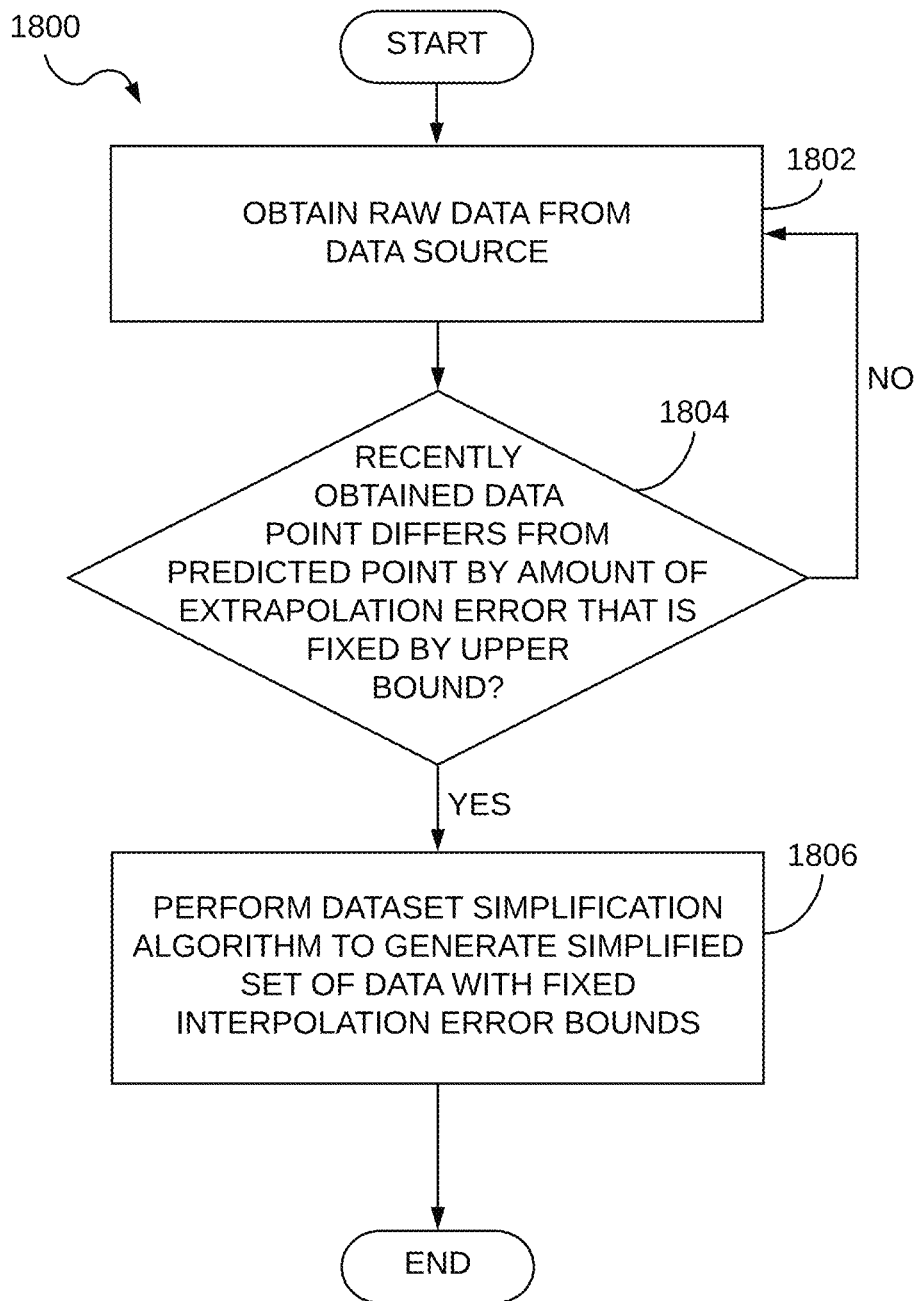
FIG. 18 is a flowchart of an example method for capturing a simplified set of data from an asset through a fixed estimation error data simplification process, in which interpolation error within the simplified set of data is limited by an upper bound that is fixed across the simplified set of data, and in which generation of the simplified set of data is triggered by satisfaction of a data logging trigger based on the vertical distance of a newly collected data point against a line that was extrapolated from the most recently recorded points.

The fixed estimate error dataset simplification algorithm and the fixed estimate error data logging algorithm described above may be applied independently or combined. FIG. 18 is a flowchart of an example method 1800 for capturing a simplified set of data from an asset through a fixed estimation error data simplification process which combines these two techniques. The method 1800 may be understood to be one further example of how simplified sets of data may be captured from the asset 102 of FIG. 1. Thus, for exemplary purposes, the method 1800 will be described with reference to the asset 102 of FIG. 1. Further, certain details of the method 1800 may be elaborated upon above within the description of FIG. 1 or elsewhere in this disclosure.

The blocks of the method 1800 may be performed by an integrated tracking system onboard the asset 102 or an asset tracking device coupled to the asset 102. Further, it is assumed that the raw data 106 includes a target set of data that is recorded over time. A target set of data refers to any particular subset of the many types of data that may be included in the raw data 106, collected at the asset 102, which is to be considered separately for simplification.

At block 1802, raw data 106 is obtained from a data source 104 at the asset 102. At block 1804, it is determined whether a data logging trigger is satisfied by determining whether a recently obtained point in the raw data 106 differs from a corresponding predicted point predicted by extrapolation based on previously saved points included in one or more previously generated simplified sets of data by an amount of extrapolation error that is limited by an upper bound that is fixed as the raw data 106 is collected over time. This determination may be made, for example, as set out in the method 1600 of FIG. 16. At block 1806, when the data logging trigger is satisfied, a dataset simplification algorithm is performed on the raw data 106 to generate the simplified set of data 112 in which interpolation error is limited by an upper bound that is fixed across the simplified set of data 112. This process may be executed, for example, as set out in the method 800 of FIG. 8.

Thus, the raw data 106 collected at the asset 102 may be monitored for the satisfaction of a data logging trigger based on consideration of the vertical deviation of each newly collected data point from a trend of the data, and once satisfied, the newly collected data may be simplified based on an iterative process that considers the vertical deviation from each newly collected data point to an appropriate reference line. As a result, raw data may be collected and simplified in such a way that value estimation calculations, i.e. interpolation and extrapolation calculations, can be made with the reliability of knowing precisely how much error is being taken on in the estimation, and with the reliability of knowing that more information is being collected around more rapidly changing data.

Figure 19:
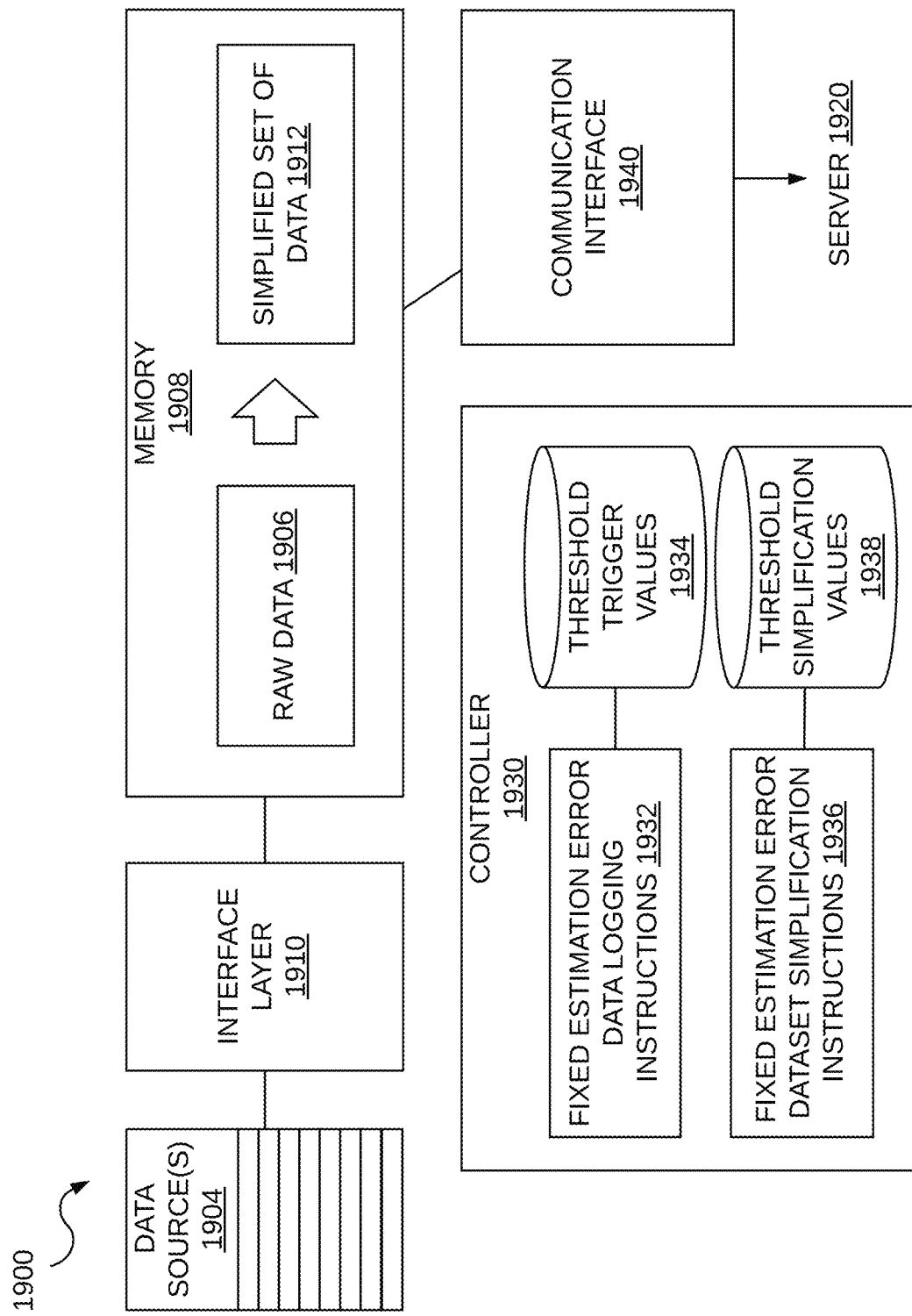
FIG. 19 is a block diagram of an example system for capturing a simplified set of data from an asset in accordance with a fixed estimation error data simplification process.

FIG. 19 is a block diagram of an example system 1900 for capturing a simplified set of data from an asset in accordance with a fixed estimation error data simplification process. The system 1900 may be understood as one example of a system for capturing the simplified set of data 112 from the asset 102 of FIG. 1. In some examples, one or more parts of the system 1900 may be embodied in a system or device that is integrated with the asset. In other examples, one or more parts of the system 1900 may be embodied in a separate asset tracking device that is coupled to the asset.

The system 1900 includes an interface layer 1910 to receive raw data 1906 from one or more data sources 1904 at an asset. A data source 1904 may include any source from which raw data 1906 may be obtained, such as a sensor (e.g., accelerometer, temperature sensor), GPS transceiver, or communication port of the asset. The interface layer 1910 includes the interfaces for receiving raw data 1906 from such data sources 1904, such as an interface for a GPS transceiver, an interface for an accelerometer, and an interface for a communication port of the asset.

The raw data 1906 generally describes a property, state, or operating condition of the asset. For example, where the asset is a vehicle, the raw data 1906 may describe the location of the vehicle, speed at which the vehicle is travelling, or an engine operating condition (e.g., engine oil temperature, engine RPM, engine cranking voltage).

Where one or more parts of the system 1900 is integrated into the asset, a data source 1904 may include an electronic control unit (ECU) of the asset from which the interface layer 1910 is configured to receive the raw data 1906 directly or via a controlled area network (CAN). Where one or more parts of the system 1900 are embodied in an asset tracking device coupled to the asset, a data source 1904 may include a communication port (e.g., an onboard diagnostic port such as an OBD2 port) of the asset through which the asset tracking device is configured to receive the raw data 1906 from one or more ECUs of the asset via a CAN.

The system 1900 further includes a memory to store the raw data 1906. The memory 1908 may include a raw data buffer in which the raw data 1906 is temporarily stored prior to data simplification, and where the raw data 1906 is monitored for satisfaction of a data logging trigger. The memory 1908 may include read-only memory (ROM), random-access memory (RAM), flash memory, magnetic storage, optical storage, or similar, or any combination thereof.

Although only a single element is shown for raw data 1906, it is to be understood that the raw data 1906 may include several data streams of several different data types, and this raw data 1906 may include one or more target sets of data that are to be simplified separately, some of which may include one data dimension and others which may include multiple data dimensions.

The system 1900 further includes a controller 1930 to execute fixed estimation error data logging instructions 1932 and/or fixed estimation error dataset simplification instructions 1936. The controller 1930 may include one or more of a processor, microprocessor, microcontroller (MCU), central processing unit (CPU), processing core, state machine, logic gate array, application-specific integrated circuit (ASIC), field-programmable gate array (FPGA), or similar, capable of executing, whether by software, hardware, firmware, or a combination of such, the actions performed by the controller 1930 as described herein. The controller 1930 includes a memory, which may include ROM, RAM, flash memory, magnetic storage, optical storage, and similar, or any combination thereof, for storing instructions and data as discussed herein, including the fixed estimation error data logging instructions 1932 and/or fixed estimation error dataset simplification instructions 1936.

The fixed estimation error data logging instructions 1932 are to cause the controller 1930 to obtain raw data 1906, determine whether a data logging trigger is satisfied by determining that a recently obtained point in the raw data 1906 differs from a corresponding predicted point predicted by extrapolation based on previously saved points included in one or more previously generated simplified sets of data by an amount of extrapolation error that is limited by an upper bound that is fixed as the raw data 1906 is collected over time. In making this determination, the controller 1930 may make reference to threshold trigger values 1934 to determine whether a recently obtained point deviates sufficiently from the trend of the data to trigger a dataset simplification algorithm.

The fixed estimation error dataset simplification instructions 1936 are to cause the controller 1930 to obtain raw data 1906, determine whether a data logging trigger is satisfied, and when satisfied, perform a dataset simplification algorithm that involves generating a simplified set of data in which interpolation error is limited by an upper bound that is fixed across the simplified set of data. In making this determination, the controller 1930 may reference threshold simplification values 1938 to determine whether a data point in a to-be-simplified set of data deviates sufficiently from a reference line running through the data to be included in the simplified set of data 1912. Thus, the system 1900 may perform one or a combination of the dataset simplification algorithm as set out in the method 700 of FIG. 7 and the data logging algorithm as set out in the method 1500 of FIG. 15.

The system 1900 further includes a communication interface 1940 to transmit the simplified set of data 1912 to a server 1920. While the data sources 1904 are located at the asset being tracked, and the interface layer 1910, memory 1908, controller 1930, and communication interface 1940 will also typically be located at the asset (either integrated into the asset or in an asset tracking device coupled to the asset), the server 1920 will typically be remote from the asset and communicate with the asset (or asset tracking device) via the communication interface 1940. The server 1920 may be part of a telematics system, such as the telematics system 120 of FIG. 1. The communication interface 1940 may include a cellular modem, such as an LTE-M modem, CAT-M modem, or other cellular modem configured for communication via the network with which to communicate with the server 1920.

The communication interface 1940 may be configured for bidirectional communication with the server 1920 to receive instructions from the server 1920, such as, for example, to make modifications to the instructions 1932, 1936, or values 1934, 1938. Indeed, in some examples, the threshold trigger values 1934 and threshold simplification values 1938 may be configured at the server 1920 and pushed to the system 1900 on demand. In other examples, the values 1934 and 1938 may have been pre-loaded into the controller 1930, subject only to later modification by the server 1920. In some examples, the fixed estimation error data logging instructions 1932 may cause the communication interface 1940 to transmit to the server 1920, along with any simplified set of data 1912, any relevant metadata, such as, for example, the type of data logging trigger that was satisfied to cause the generation of the simplified set of data 1912, and the values of the threshold trigger value(s) 1934 and threshold simplification value(s) 1938 that were used in the generation of the simplified set of data 1912.

The server 1920 is to receive the simplified set of data 1912 and provide the simplified set of data 1912 for a telematics service or other purposes. The server 1920 may provide the simplified set of data 1912 itself (and previously recorded data) for such purposes, and, where appropriate, interpolate and/or extrapolate based on the simplified set of data 1912 (and previously recorded data if appropriate). In other words, the server 1920 may provide an indication of the interpolated status or extrapolated status of the asset to an end user device. Such information may be provided on an ongoing basis or in response to requests.

The server 1920 may also provide the upper bounds on any interpolation error or extrapolation error that was assumed in the generation of such simplified sets of data 1912. In other words, the server 1920 may provide an indication of the upper bound on interpolation or the upper bound on extrapolation error to an end user device. Such information may be provided on an ongoing basis or in response to requests.

Figure 22:
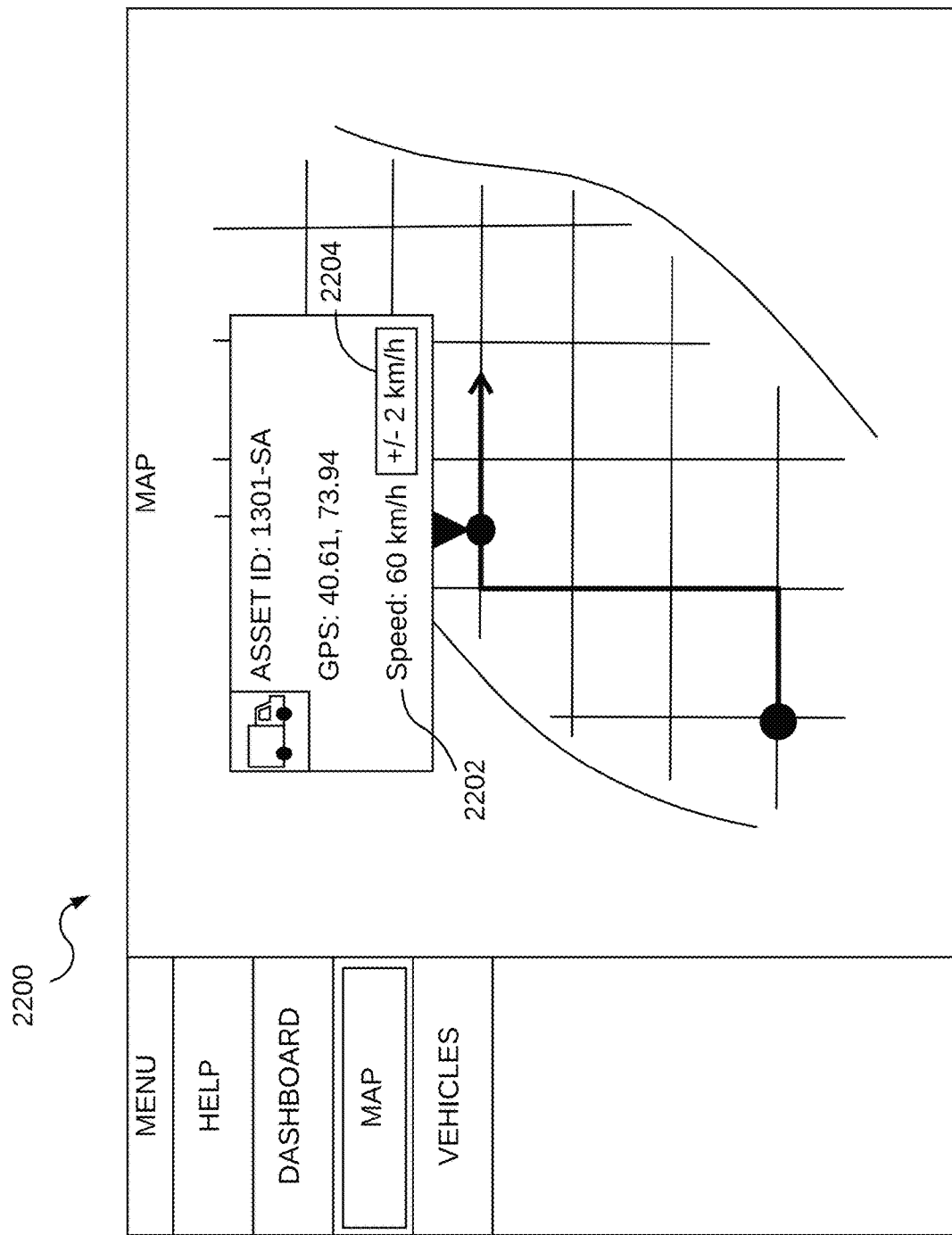
FIG. 22 is a schematic diagram of an example user interface displayed at an end user device that shows trip information regarding the travel of a vehicle asset including an indication of an interpolated status of the asset and an indication of an upper bound on interpolation error associated with the status.

The status of an asset may be provided in a user interface at an end user device along with any upper bounds on interpolation error and/or extrapolation error that were associated with the provision of such information. For example, where a user interface displays a current vehicle speed of an asset as being "60 km/h" (calculated by extrapolation), the user interface may also display that the provided value is accurate within "2 km/h" (based on a threshold trigger value of 2 km/h). An example of such an interface is shown in FIG. 22, which is a schematic diagram of an example user interface 2200 displayed at an end user device that shows trip information regarding the travel of a vehicle asset, including an indication 2202 of the interpolated status of the asset and an indication 2204 of the upper bound on interpolation error associated with the status. The user interface 2200 may be similarly configured to display an indication of an extrapolated status (e.g., current status) of the asset and an indication of the upper bound on extrapolation error.

Figure 20:
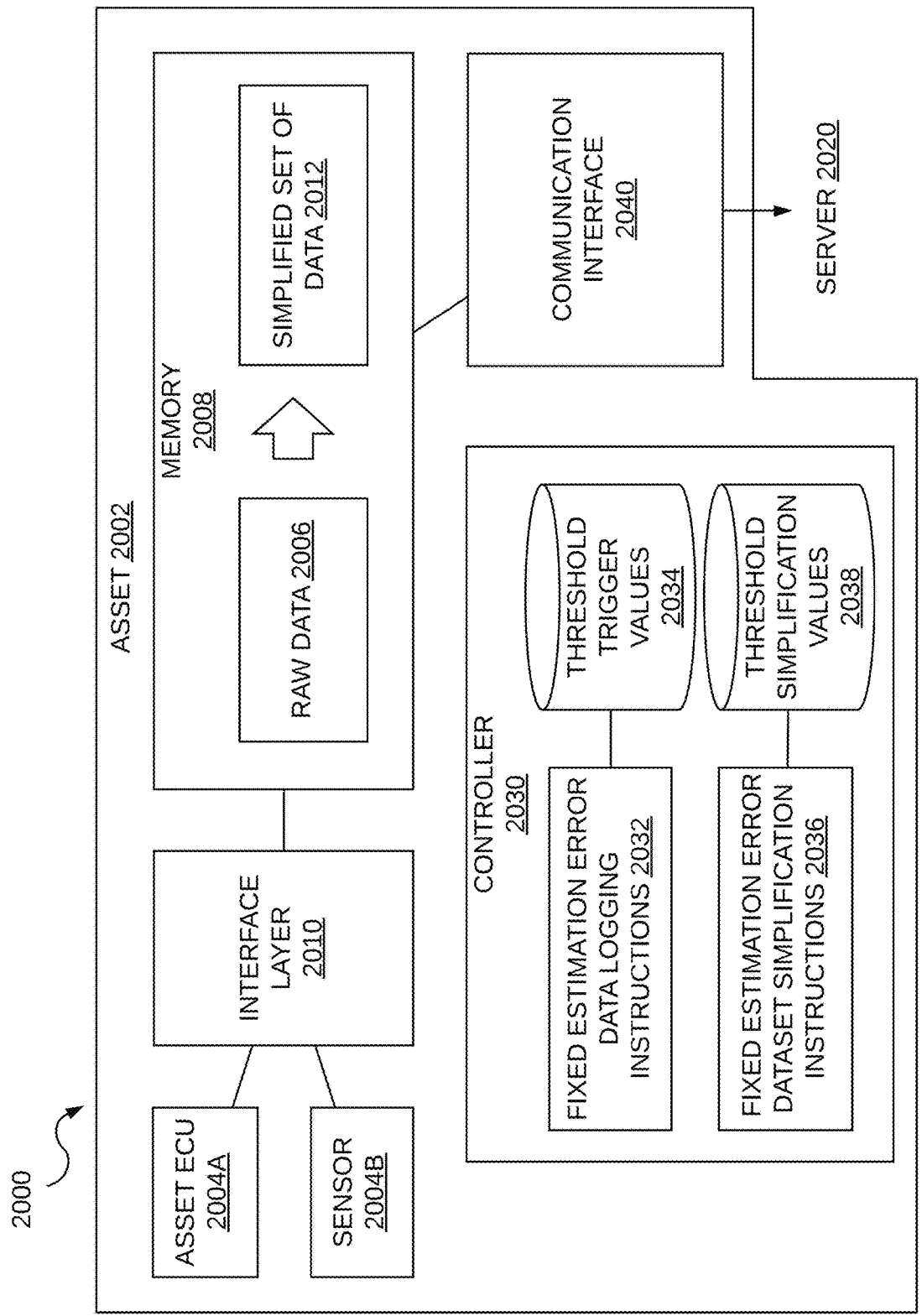
FIG. 20 is a block diagram of another example system for capturing a simplified set of data from an asset in accordance with a fixed estimation error data simplification process in which one or more parts of the system are integrated into the asset.

FIG. 20 is a block diagram of another example system 2000 for capturing a simplified set of data from an asset in accordance with a fixed estimation error data simplification process. The system 2000 is similar to the system 1900 of FIG. 19, with tracking capability integrated into an asset 2002, and with elements numbered in the "2000" series rather than the "1900" series. The system 2000 therefore includes an interface layer 2010, a memory 2008 that stores raw data 2006 and a simplified set of data 2012 (once generated), a controller 2030 that stores fixed estimation error data logging instructions 2032, threshold trigger values 2034, fixed estimation error dataset simplification instructions 2036, and threshold simplification values 2038, a communication interface 2040, and a server 2020. For further description of these elements, reference may be had to the like elements of the system 1900 of FIG. 19.

However, in the system 2000, the interface layer 2010, memory 2008, controller 2030, and communication interface 2040 are integrated into the asset 2002. Further, the asset 2002 includes one or more Electronic Control Units (ECUs) 2004A and sensors 2004B from which the interface layer 2010 is configured to receive the raw data 2006 directly or via a controller area network (CAN). Thus, the ECU 2004A and sensor 2004B act as data sources from which the interface layer 2010 obtains the raw data 2006.

Figure 21:
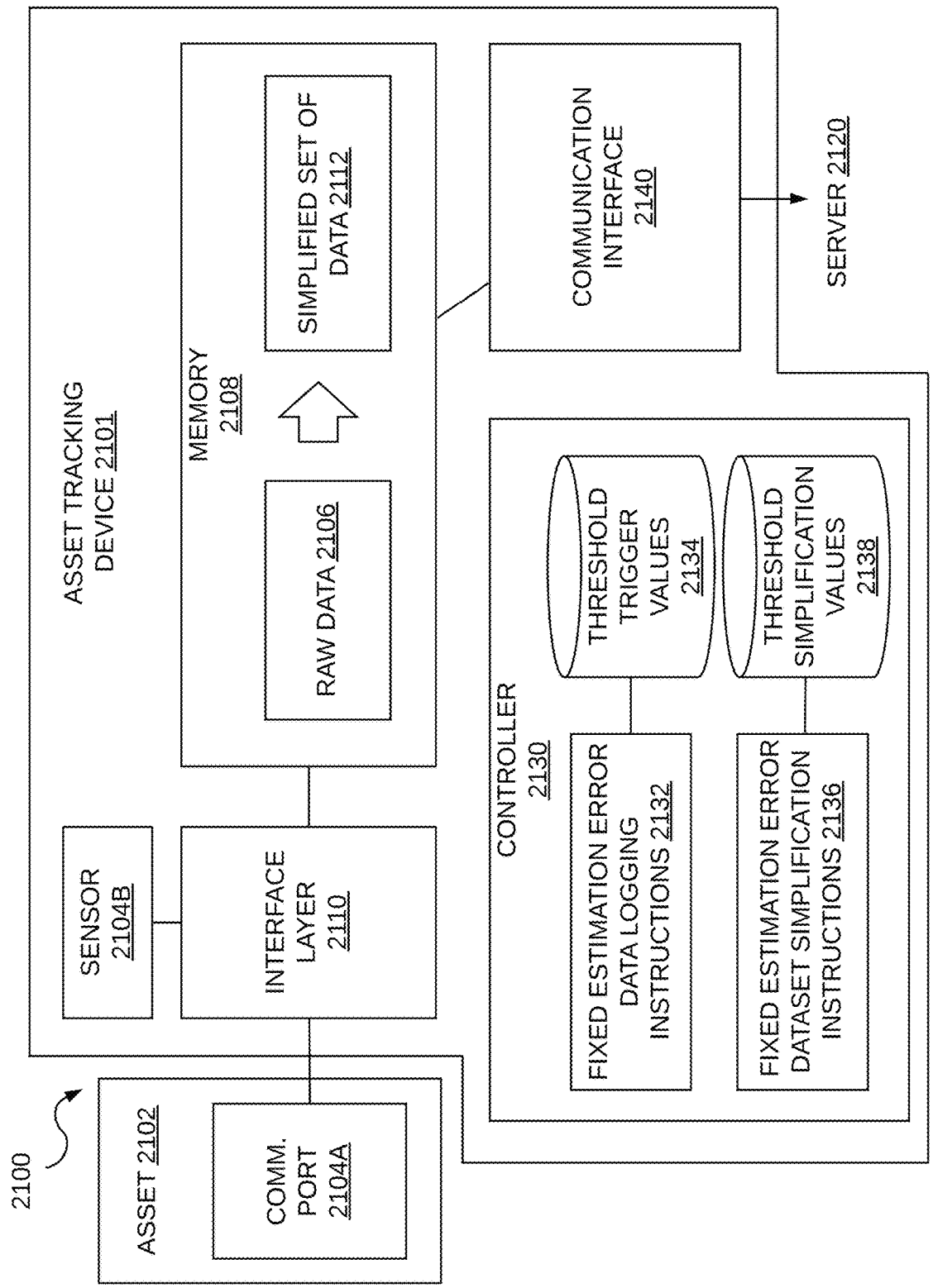
FIG. 21 is a block diagram of another example system for capturing a simplified set of data from an asset in accordance with a fixed estimation error data simplification process in which the data is collected by an asset tracking device coupled to the asset.

FIG. 21 is a block diagram of another example system 2100 for capturing a simplified set of data from an asset in accordance with a fixed estimation error data simplification process. The system 2100 is similar to the system 1900 of FIG. 19, with its tracking capability included in an asset tracking device 2101 that is coupleable to an asset 2102, and with elements numbered in the "2100" series rather than the "1900" series. The system 2100 therefore includes an interface layer 2110, a memory 2108 that stores raw data 2106 and a simplified set of data 2112 (once generated), a controller 2130 that stores fixed estimation error data logging instructions 2132, threshold trigger values 2134, fixed estimation error dataset simplification instructions 2136, and threshold simplification values 2138, a communication interface 2140, and a server 2120. For further description of these elements, reference may be had to the like elements of the system 1900 of FIG. 19.

However, in the system 2100, the interface layer 2110, memory 2108, controller 2130, and communication interface 2140 are included in an asset tracking device 2101 that is coupled to the asset 2102. Further, the asset 2102 includes one or more communication ports 2104A with which the asset tracking device 2101 may interface, and through which the asset tracking device 2101 is configured to receive raw data 2106 from one or more Electronic Control Units (ECUs) (not shown) of the asset 2102, via, for example, a controller area network (CAN). Further, the asset tracking device 2101 also includes one or more sensors 2104B from which the interface layer 2110 may obtain raw data 2106. Thus, the communication port 2104A and sensor 2104B act as data sources from which the interface layer 2010 obtains the raw data 2106.

Thus, it should be seen that the data collected from an asset may be simplified, reduced, filtered, or sampled into the most operationally-salient data for a telematics system through a fixed estimation error data simplification process. A simplified set of data may be generated in which the amount of error associated with an interpolation or extrapolation calculation based on the simplified set of data is fixed by a known upper bound and consistent throughout the simplified set of data. These upper bounds may be defined in units that match the units in which the data is being collected and/or presented to an end user, which provides transparency and confidence in the precision of the simplified data. Such a data simplification process emphasizes the "vertical" deviation of each collected data point to overcome biases caused by the "horizontal" collection of such data over time. Further, such a data simplification process captures higher resolution data in sections where the data is changing more quickly, resulting in a richer set of data around points in time that are likely to be of greater interest.

It should be recognized that features and aspects of the various examples provided above can be combined into further examples that also fall within the scope of the present disclosure. The scope of the claims should not be limited by the above examples but should be given the broadest interpretation consistent with the description as a whole.

The invention claimed is:

1. A method comprising:
obtaining a set of data from a data source at a vehicle, wherein the data describes a property, state, or operating condition of the vehicle, and wherein the set of data forms a curve having a time dimension and a data dimension;
determining whether a data logging trigger is satisfied;
when the data logging trigger is satisfied, performing a dataset simplification algorithm on the set of data to save one or more points of the data in a simplified set of data composed of fewer points; and
transmitting the simplified set of data to a server so that the server can determine an estimated property, state, or operating condition of the vehicle associated with a known degree of precision based on a fixed amount of extrapolation error,
wherein it is determined that the data logging trigger is satisfied by determining that a recently obtained point of the data is distant, along the data dimension, from a trend line extrapolated from two or more previously saved points that were saved in one or more previous simplified sets of data, in excess of a threshold amount, wherein the threshold amount is defined in the data dimension.

2. The method of claim 1, wherein determining whether the data logging trigger is satisfied involves:
(i) defining the trend line;
(ii) determining whether the recently obtained point is distant, along the data dimension, from the trend line, in excess of the threshold amount; and
(iii) if the recently obtained point is distant, along the data dimension, from the trend line, in excess of the threshold amount, determining that the data logging trigger is satisfied.

3. The method of claim 1, wherein the dataset simplification algorithm reduces the curve formed by the data into a simplified curve composed of fewer points and excludes points of the data from the simplified set of data that are within a second threshold distance, defined in the data dimension, from the simplified curve.

4. The method of claim 1, wherein the data is obtained from an electronic control unit (ECU) of the vehicle.

5. The method of claim 1, further comprising coupling an asset tracking device to a communication port of the vehicle, wherein the data is obtained from one or more of:

the communication port of the vehicle; and a sensor of the asset tracking device.

6. The method of claim 1, wherein the method further comprises collecting the data from a sensor.

7. A device comprising:

an interface layer to receive a set of data from one or more data sources at a vehicle, wherein the data describes a property, state, or operating condition of the vehicle, and wherein the set of data forms a curve having a time dimension and a data dimension;

memory to store the set of data;

a controller to:

determine whether a data logging trigger is satisfied; and when the data logging trigger is satisfied, perform a dataset simplification algorithm on the set of data to save one or more points of the data in a simplified set of data composed of fewer points; and a communication interface to transmit the simplified set of data to a server so that the server can determine an estimated property, state, or operating condition of the vehicle associated with a known degree of precision based on a fixed amount of extrapolation error, wherein the controller determines that the data logging trigger is satisfied by determining that a recently obtained point of data is distant, along the data dimension, from a trend line extrapolated from two or more previously saved points that were saved in one or more previous simplified sets of data, in excess of a threshold amount, wherein the threshold amount is defined in the data dimension.

8. The device of claim 7, wherein the controller determines whether the data logging trigger is satisfied by:

(i) defining the trend line;

(ii) determining whether the recently obtained point is distant, along the data dimension, from the trend line, in excess of the threshold amount; and (iii) if the recently obtained point is distant, along the data dimension, from the trend line, in excess of the threshold amount, determining that the data logging trigger is satisfied.

9. The device of claim 7, wherein the memory includes a data buffer in which the data is temporarily stored prior to dataset simplification.

10. The device of claim 7, wherein the dataset simplification algorithm reduces the curve formed by the data into a simplified curve composed of fewer points and excludes points of the data from the simplified set of data that are within a second threshold distance, defined in the data dimension, from the simplified curve.

11. The device of claim 7, wherein the device is integrated into the vehicle-asset, and the data source from which the data is obtained comprises an electric control unit (ECU) of the vehicle-asset.

12. The device of claim 7, wherein the device is an asset tracking device coupleable to a communication port of the vehicle, and the data source from which the data is obtained comprises one or more of:

the communication port of the vehicle; and a sensor of the asset tracking device.

13. The device of claim 7, wherein the device further comprises a sensor to collect the data.

* * * * *

UNITED STATES PATENT AND TRADEMARK OFFICE
CERTIFICATE OF CORRECTION

PATENT NO. : 11,593,329 B2
APPLICATION NO. : 17/084062
DATED : February 28, 2023
INVENTOR(S) : Alexey Sukhov et al.

Page 1 of 1

It is certified that error appears in the above-identified patent and that said Letters Patent is hereby corrected as shown below:

In the Claims

At Column 34, Line number 22, in Claim 11, please delete the word "-asset";

At Column 34, Line number 24, in Claim 11, please delete the word "-asset".

Signed and Sealed this
Fourth Day of April, 2023

Katherine Kelly Vidal
*Director of the United States Patent and Trademark Office*